US011310954B2

(12) United States Patent
Pickett et al.

(10) Patent No.: US 11,310,954 B2
(45) Date of Patent: Apr. 26, 2022

(54) METHODS AND APPARATUS FOR EFFICIENT MATERIAL APPLICATION

(71) Applicant: Deere & Company, Moline, IL (US)

(72) Inventors: Terence D. Pickett, Urbandale, IA (US); Travis J. Davis, Urbandale, IA (US); Brandon M. McDonald, Urbandale, IA (US)

(73) Assignee: Deere & Company, Moline, IL (US)

( * ) Notice: Subject to any disclaimer, the term of this patent is extended or adjusted under 35 U.S.C. 154(b) by 61 days.

(21) Appl. No.: 16/129,704

(22) Filed: Sep. 12, 2018

(65) Prior Publication Data
US 2020/0077576 A1 Mar. 12, 2020

(51) Int. Cl.
| | | |
|---|---|---|
| *A01M 21/04* | (2006.01) | |
| *A01D 43/14* | (2006.01) | |
| *A01C 15/00* | (2006.01) | |
| *A01D 101/00* | (2006.01) | |

(52) U.S. Cl.
CPC ............ *A01C 15/008* (2013.01); *A01D 43/14* (2013.01); *A01D 2101/00* (2013.01); *A01M 21/043* (2013.01)

(58) Field of Classification Search
CPC .... A01C 15/008; A01D 43/14; A01M 21/043; Y10T 137/469; A01G 25/165; A01G 25/167
USPC .................. 239/159, 148; 137/256, 113, 391
See application file for complete search history.

(56) References Cited

U.S. PATENT DOCUMENTS

| | | | | |
|---|---|---|---|---|
| 2,618,576 A | * | 11/1952 | Brown et al. ........... | C04B 28/06 427/427 |
| 2,659,624 A | * | 11/1953 | Harz ................... | A01M 7/0053 239/164 |
| 3,617,029 A | * | 11/1971 | Breer ..................... | B29B 7/603 422/133 |

(Continued)

FOREIGN PATENT DOCUMENTS

DE 102010023380 A1 12/2011

OTHER PUBLICATIONS

Garvey, Scott,"Amazone sprayers go high tech: The brand builds cutting-edge technology into its pull-type sprayers," https://www.grainews.ca/2017/12/05/amazone-sprayers-go-high-tech/, published Dec. 5, 2017, retrieved on Nov. 28, 2018, 10 pages.

(Continued)

*Primary Examiner* — Joseph A Greenlund
(74) *Attorney, Agent, or Firm* — Hanley, Flight & Zimmerman, LLC

(57) ABSTRACT

Methods, apparatus, systems and articles of manufacture are disclosed for efficient material application. An example landscape treatment apparatus includes a main carrier tank to store a solvent, a concentrate tank to store a solute, and a first mix tank to receive the solvent and the solute as a first mixture. The example apparatus further includes a second mix tank to receive the solvent and the solute as a second mixture, where the first mix tank is to receive the solvent and the solute in alternation with the second mix tank receiving the solvent and the solute. The example apparatus also includes a boom to apply the first mixture and the second mixture to a landscape via a plurality of nozzles, where the boom is to apply the first mixture and the second mixture in alternation.

22 Claims, 14 Drawing Sheets

(56) References Cited

U.S. PATENT DOCUMENTS

| | | | | |
|---|---|---|---|---|
| 3,933,309 | A * | 1/1976 | Odegaard | B05B 1/20 239/171 |
| 4,358,054 | A * | 11/1982 | Ehrat | B05B 9/06 239/155 |
| 4,823,268 | A * | 4/1989 | Giles | A01M 7/0089 239/77 |
| 4,881,820 | A * | 11/1989 | Luckhoff | B01F 15/0237 366/142 |
| 4,932,609 | A * | 6/1990 | Secchiaroli | B64C 17/10 137/256 |
| 5,502,685 | A * | 3/1996 | Orlando | A01M 7/0092 137/113 |
| 5,927,603 | A * | 7/1999 | McNabb | A01G 25/092 239/63 |
| 6,874,929 | B2 * | 4/2005 | Hiraoka | B01F 3/088 366/152.6 |
| 6,962,627 | B2 * | 11/2005 | Sekiguchi | B05C 11/1047 118/693 |
| 7,384,183 | B2 * | 6/2008 | Smith | B08B 3/003 366/162.1 |
| 8,437,879 | B2 * | 5/2013 | Anderson | A01G 25/167 700/284 |
| 9,655,356 | B1 * | 5/2017 | Lytle, Jr. | B05B 12/1472 |
| 9,896,980 | B2 * | 2/2018 | Gundrum | F01N 3/208 |
| 2004/0034459 | A1 * | 2/2004 | Hoelscher | A01M 7/0089 701/50 |
| 2010/0299030 | A1 * | 11/2010 | Mitchell | A01B 79/005 701/50 |
| 2011/0266357 | A1 * | 11/2011 | Orcutt | A01C 23/001 239/1 |
| 2012/0037057 | A1 * | 2/2012 | Beaujot | A01C 21/005 111/14 |
| 2013/0333342 | A1 * | 12/2013 | Keski-Luopa | A01D 69/02 56/10.2 A |
| 2015/0245565 | A1 * | 9/2015 | Pilgrim | A01C 21/002 280/79.2 |
| 2017/0071188 | A1 * | 3/2017 | Rees | G06K 9/52 |
| 2017/0295719 | A1 * | 10/2017 | Jugovich | A01M 7/0089 |
| 2017/0367276 | A1 * | 12/2017 | Itzhaky | G06K 9/00657 |
| 2018/0007847 | A1 * | 1/2018 | Raj | G05D 1/0094 |
| 2019/0104722 | A1 * | 4/2019 | Slaughter | A01D 34/008 |
| 2019/0255539 | A1 * | 8/2019 | Muscat | B05B 13/00 |
| 2019/0297799 | A1 * | 10/2019 | LaRue | A01G 25/092 |
| 2020/0045952 | A1 * | 2/2020 | Hartman | A01M 7/0042 |
| 2020/0072809 | A1 * | 3/2020 | Bhanu | A01G 7/06 |
| 2020/0077576 | A1 * | 3/2020 | Pickett | A01D 43/14 |
| 2021/0169025 | A1 * | 6/2021 | Burgard | G05B 19/042 |

OTHER PUBLICATIONS

Romeo, Juan, et al.,"Camera Sensor Arrangement for Crop/Weed Detection Accuracy in Agronomic Images," https://www.ncbi.nlm.nih.gov/pmc/articles/PMC3673087/, published Apr. 2, 2013, retrieved on Nov. 28, 2018, 21 pages.

Meyer, George, "Machine Vision Identification of Plants," http://cdn.intechopen.com/pdfs/22613/InTech-Machine_vision_identification_of_plants.pdf, retrieved on Nov. 28, 2018, 22 pages.

Weedseeker, "Weedseeker," http://www.lasermanca.com/catalog/agriculture/application-control/weedseeker.html, retrieved on Nov. 28, 2018, 7 pages.

GPA Group Channel,"A tractor spraying herbicide selectively into weeds patches," https://www.youtube.com/watch?v=FfDHA-Jmfrc, published Feb. 13, 2015, retrieved on Nov. 28, 2018.

European Search Report issued in counterpart European Patent Application No. 19195138.3, dated Jan. 17, 2020 (7 pages).

* cited by examiner

US 11,310,954 B2

METHODS AND APPARATUS FOR EFFICIENT MATERIAL APPLICATION

FIELD OF THE DISCLOSURE

This disclosure relates generally to landscape equipment, and, more particularly, to methods and apparatus for efficient material application.

BACKGROUND

Tractors can be utilized for numerous lawn maintenance procedures. Tractors can include accessories for spraying weeds, depositing fertilizer, or other lawn treatment processes. Accessories for material application (e.g., for spraying weed killer or other lawn treatments) can be mounted to a front end or a rear end of a tractor, and operated as the tractor travels over the lawn.

SUMMARY

An example apparatus disclosed herein includes a main carrier tank to store a solvent, a concentrate tank to store a solute, a first mix tank to receive the solvent and the solute as a first mixture, a second mix tank to receive the solvent and the solute as a second mixture, the first mix tank to receive the solvent and the solute in alternation with the second mix tank receiving the solvent and the solute, the first mix tank to be pressurized after a first fluid level of the first mixture in the first mix tank satisfies a first upper fill threshold and the second mix tank to be pressurized after a second fluid level of the second mixture in the second mix tank satisfies a second upper fill threshold, and a boom to apply the first mixture and the second mixture to a landscape via a plurality of nozzles, the boom to apply the first mixture and the second mixture in alternation.

An example non-transitory computer readable storage medium disclosed herein includes instructions that, when executed, cause a processor to at least issue control signals to cause a first mix tank to receive a solvent and a solute as a first mixture, cause a second mix tank to receive the solvent and the solute as a second mixture, the control signals to cause the first mix tank to receive the solvent and the solute in alternation with the second mix tank receiving the solvent and the solute, cause the first mix tank to be pressurized when a first fluid level of the first mixture in the first mix tank satisfies a first upper fill threshold, cause the second mix tank to be pressurized when a second fluid level of the second mixture in the second mix tank satisfies a second upper fill threshold, cause a boom to apply the first mixture and the second mixture to a landscape via a plurality of nozzles, the boom to apply the first mixture and the second mixture in alternation.

An example method disclosed herein includes storing a solvent, storing a solute, mixing the solvent and the solute to form a first mixture in a first mix tank, mixing the solvent and the solute to form a second mixture in a second mix tank in alternation with mixing the solvent and the solute to form the first mixture, pressurizing the first mix tank when a first fluid level of the first mixture in the first mix tank satisfies a first upper fill threshold, pressurizing the second mix tank when a second fluid level of the second mixture in the second mix tank satisfies a second upper fill threshold, applying the first mixture to a landscape, and applying the second mixture to the landscape in alternation with applying the first mixture to the landscape.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1A:
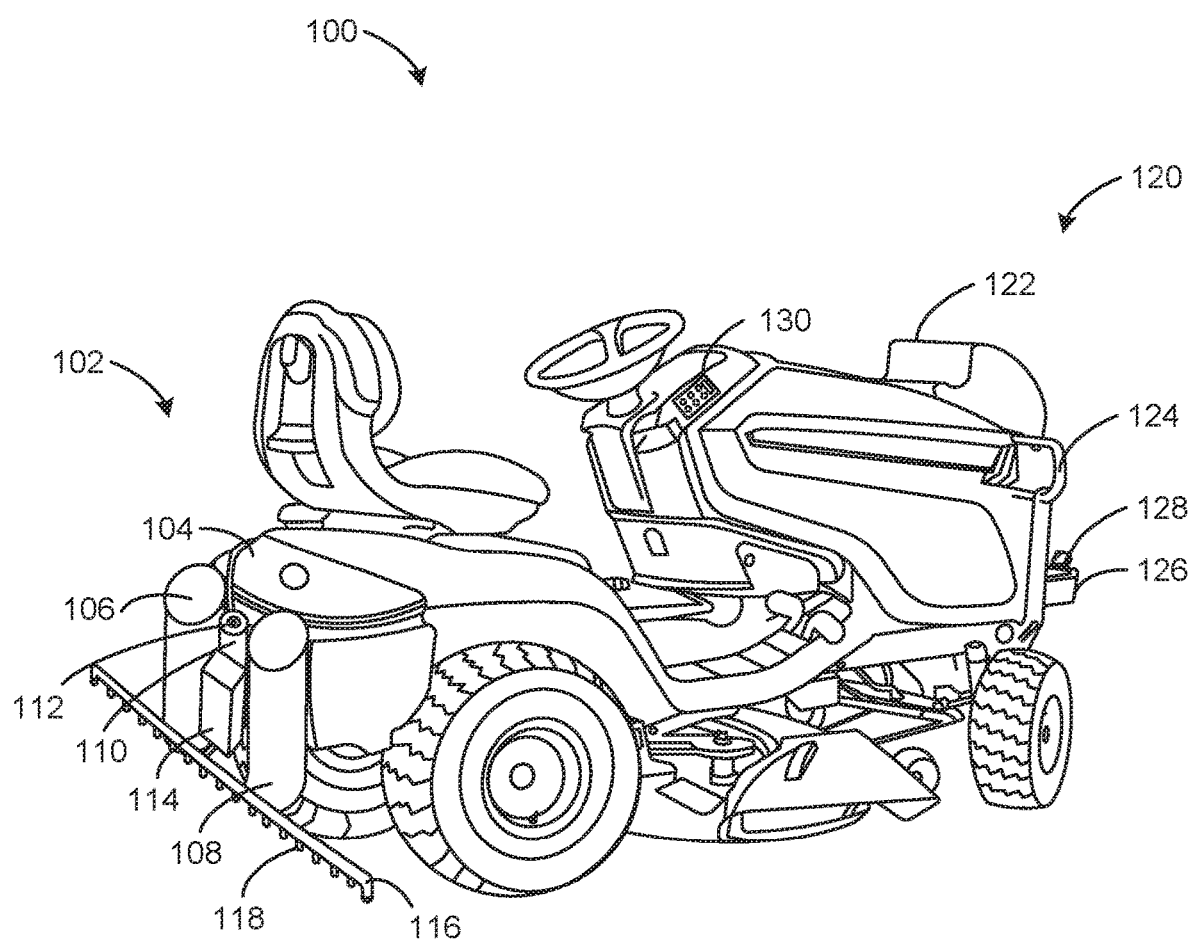
FIG. 1A is a rear perspective view of an example tractor with which the methods and apparatus disclosed herein may be implemented.

Tractors conventionally apply lawn treatments (e.g., weed spraying, fertilization, etc.) in a non-targeted manner, depositing treatment evenly as the tractor moves over the surface of the lawn (e.g., turf) when a spraying mechanism is enabled. As a result, areas of lawn can be over-treated or under-treated, due to the generalized nature of the treatment. This is not only less effective at accomplishing the objective of the treatment but also results in wasted treatment. Tractors can have large area spray mechanisms (e.g., nozzles) that span across a width of the tractor. In some examples, these spray mechanism(s) are attached to the rear end of the tractor, making it difficult for an operator to determine when a tractor is over a desired treatment target. Considering the tractor is typically moving as it applies the lawn treatment, the task of enabling the spray mechanism(s) to spray the desired target is particularly cumbersome.

Some conventional tractors require a concentrated lawn treatment substance be manually pre-mixed by a user and then attached to the tractor to be deposited onto the lawn. In some examples, these pre-mixed substances must be used at once, as they cannot be stored for future use once mixed. These pre-mixed solutions therefore result in over-use of the lawn treatment, as the operator typically applies the lawn treatment until all of the mixed solution is used, regardless of the actual lawn treatment requirements. When an operator desires to alternate between different lawn treatments (e.g., transitioning from applying a fertilizer to a weed-spraying solution), conventional tractors may be difficult to clean-out to prevent cross-contamination of the previously applied lawn treatment, requiring manual clean-out of components (e.g., hoses, valves, storage containers, etc.) that interact with the lawn treatment.

Example methods, apparatus, systems, and articles of manufacture (e.g., physical storage media) for efficient lawn spraying are disclosed herein. Some example lawn spraying methods, apparatus, systems and articles of manufacture disclosed herein include utilizing one or more mix tank(s) to automatically mix a concentrate solution (e.g., a weed-spraying concentrate, a fertilizer concentrate, etc.) with a main carrier (e.g., a solvent, such as water, etc.) to form a lawn treatment mixture that is subsequently sprayed in a targeted manner. For example, an operator can connect a concentrate bottle to the tractor, and the lawn spraying system of the tractor can mix small amounts of the concentrate solution with the main carrier as it is required (e.g., when the user enables a spraying mode). When the operator desires to apply a different lawn treatment, the concentrate bottle can be detached and stored for future use, and a new concentrate bottle for the new lawn treatment can be connected. By only preparing the amount of lawn treatment mixture that is required at a given time, the operator can selectively apply lawn treatment only when required, and does not feel an obligation to use a large batch of lawn treatment mixture in the way one may be compelled to do when using conventional manually-mixed lawn treatments. The example techniques disclosed herein further advantageously mix concentrate solution with a main carrier to create a correctly proportion concentrate solution mixture prior to spraying the lawn treatment mixture, unlike a direct-injection style solution that may mix the concentrate solution and main carrier in a spray line (e.g., by spraying the mixture at the same time as it is prepared). This pre-mixing results in a reliable and repeatable lawn treatment mixture.

In some examples, two mix tanks are utilized to enable one mix tank to be mixed and prepared while the other mix tank supplies the lawn treatment that is sprayed. In such examples, one or more fluid level sensor(s) can be utilized to monitor filling status(es) of the mix tanks, such that once a mix tank is filled with a lawn treatment mixture beyond a filling threshold, the mix tank can be pressurized and readied for spraying. Similarly, in some examples, one or more fluid level sensor(s) can be utilized to determine when one of the mix tanks does not have sufficient lawn treatment mixture to continue spraying, and thereby begin filling this mix tank and utilizing the other mix tank as a spraying mix tank, assuming the other mix tank has sufficient lawn treatment mixture. By alternating spraying and filling between two mix tanks, there is continuous availability of consistent lawn treatment mixture, and minimal leftover lawn treatment mixture when a treatment process concludes.

Some example lawn spraying methods, apparatus, systems and articles of manufacture disclosed herein include an automatic lawn treatment mode to apply targeted lawn treatment. Some example techniques include identifying one or more target(s) (e.g., weeds, areas requiring fertilization, etc.) utilizing one or more camera(s) (e.g., attached to the front of the tractor) and spraying the target(s) at times when nozzles are positioned over the target(s). In some examples, targets are detected based on a shape identified in an image captured by the camera(s), a texture identified in an image captured by the camera(s), a pattern identified in a series of images (e.g., of a shape approaching the tractor), a color identified in an image, in addition to other image characteristics. For example, the system may recognize dandelions or other undesired plants that may be encountered by the tractor.

In some examples, machine learning can additionally or alternatively be utilized to train a model (e.g., a neural network) for target identification and subsequently analyze images captured by the camera(s) against the model to identify targets. For example, the drive may inform the control system when to spray and the system may use that information with the optical information to "learn" when to spray.

Example lawn spraying apparatus disclosed herein include a plurality of nozzles that can individually actuate, where ones of the plurality of nozzles are directed toward a relatively small spray area (relative to the overall spray area reach of the lawn spraying system). By identifying and spraying specific targets, example methods, apparatus, systems and articles of manufacture disclosed herein enable highly efficient lawn treatment which more effectively addresses specific needs of the lawn (e.g., spraying weeds, fertilizing low-growth areas, etc.) and wastes minimal amounts of lawn treatment mixture by not spraying areas where treatment is not required. Further, the lawn treatment steps can be performed automatically: the lawn treatment mixture is prepared automatically as it is required, spray targets are identified automatically as the tractor travels across the lawn, and the spray targets are sprayed by one or more nozzle(s) when the nozzle(s) are positioned over the spray targets.

In some example lawn spraying methods, apparatus, systems and articles of manufacture disclosed herein, positioning data is used to generate, update and analyze maps of lawn treatment applications to enable more efficient and effective long-term treatment solutions. For example, some tractors include global positioning system (GPS) receivers that are able to track a location of the tractor, and store location information in conjunction with data pertaining to lawn treatment activity as mapping data. In some examples, this mapping data can be utilized to further improve the efficiency with which lawn treatments are utilized by avoiding repeated spraying of a target more than desired.

In some examples, when a spray target is identified based on image data from the one or more camera(s) attached to the tractor, a query is placed relative to the mapping data to determine whether the spray target has been sprayed within a threshold time period, and to subsequently suppress spraying if the spray target has been sprayed within the time period. Such mapping data can be further utilized to provide an operator with efficiency-improving data outputs regarding an appropriate lawn treatment schedule based on observed spray targets. For example, if the lawn spraying system identifies a large patch of a specific spray target (e.g., dandelions, chickweed, etc.) at a specific location on a lawn, the lawn spraying system can alert, remind, or otherwise inform the operator of an appropriate future time to travel to this location and initiate spraying of these previously identified targets, based on known best-practices for the type of spray target (e.g., dandelions, chickweed, etc.). In some examples, the lawn spraying system can additionally update the models when spray targets are subsequently encountered (e.g., as determined by the image data and the location data) based on changes in the qualities of the spray target (e.g., an indication of improvement, such as a previously sprayed weed being less prominent in new images).

Some example lawn spraying methods, apparatus, systems and articles of manufacture disclosed herein further include an auto-cleanout feature, enabling the lawn spraying system to clean out feed lines, valves, nozzles, and other components of the lawn spraying system automatically. In some examples, the lawn spraying system provides instructions to an operator to remove any currently attached concentrate bottle and slowly drive the tractor over an open area to enable several operations to automatically clean out the lawn spraying system using the main carrier (e.g., water). In contrast to conventional techniques, this auto-cleanout method quickly, and with little operator effort, ensures that system components are cleaned of any contamination from previously used concentrate solutions.

In some examples, the lawn spraying system can communicate (e.g., via WiFi, Bluetooth, or other connection medium) with an operator's personal device (e.g., a cell phone, a tablet, a laptop, etc.) to access lawn treatment data, control operation of the tractor, receive maintenance alerts, etc.

These and other techniques, methods, apparatus, systems and articles of manufacture for efficient lawn spraying are disclosed in greater detail below.

FIG. 1A is a rear perspective view of an implement, such as an example tractor 100 with which the methods, apparatus, and techniques disclosed herein may be implemented. In some examples, instead of the tractor 100, the implement is a truck, a plow (e.g., a snow plow), all-terrain vehicle, combine, etc. The example tractor 100 includes an example rear end 102 including an example main carrier tank 104, an example first mix tank 106, an example second mix tank 108, an example concentrate bottle 110, an example concentrate bottle top 112, an example control assembly 114, an example boom 116, and example nozzles 118. The tractor 100 further includes an example front end 120 including an example GPS receiver 122, an example brush guard 124, an example front bar 126, and example cameras 128. The tractor 100 also includes an operator controller 130. While the tractor 100 represents one possible configuration and combination of the aforementioned components, any one or more of the aforementioned components may be omitted, replaced, or alternatively configured compared to the tractor 100 of FIGS. 1A and 1B.

The example main carrier tank 104 of the example tractor 100 is a storage container for a main carrier substance of a lawn treatment mixture. In some examples, the main carrier tank 104 stores water. The main carrier stored in the main carrier tank 104 can be used to dilute a concentrate substance stored in the concentrate bottle 110 to form a lawn treatment mixture. In some examples, the main carrier tank 104 is connected via one or more valves and one or more lines (e.g., hoses, pipes, etc.) to the first mix tank 106, the second mix tank 108, and the concentrate bottle 110. In some examples, the main carrier tank 104 is positioned so as to gravity-feed main carrier to the first mix tank 106 and the second mix tank 108. Further detail of an example configuration of the main carrier tank 104 is illustrated and described in association with FIG. 2.

The example first mix tank 106 of the example tractor 100 is a storage container utilized in to store a mixture of the main carrier substance stored in the main carrier tank 104 and the concentrate substance stored in the concentrate bottle 110. In some examples, the first mix tank 106 includes, or is connected to, one or more fluid level sensors to monitor the lawn treatment mixture level in the first mix tank 106. The second mix tank 108 is substantially duplicative of the first mix tank 106, to enable alternation between preparing lawn treatment mixture in one of the first and second mix tanks 106, 108, while the other one of the first and second mix tanks 106, 108 is used to supply the boom 116 with lawn treatment mixture as required. In some examples, the first mix tank 106 and the second mix tank 108 may have different dimensions and/or configurations to enable alternate use cases. For example, the first mix tank 106 may have a larger volume than the second mix tank 108 and/or may serve a different function than the second mix tank 108. In some examples, the first mix tank 106 may store a first lawn treatment mixture and the second mix tank 108 may store a second, chemically different, lawn treatment mixture.

Figure 2:
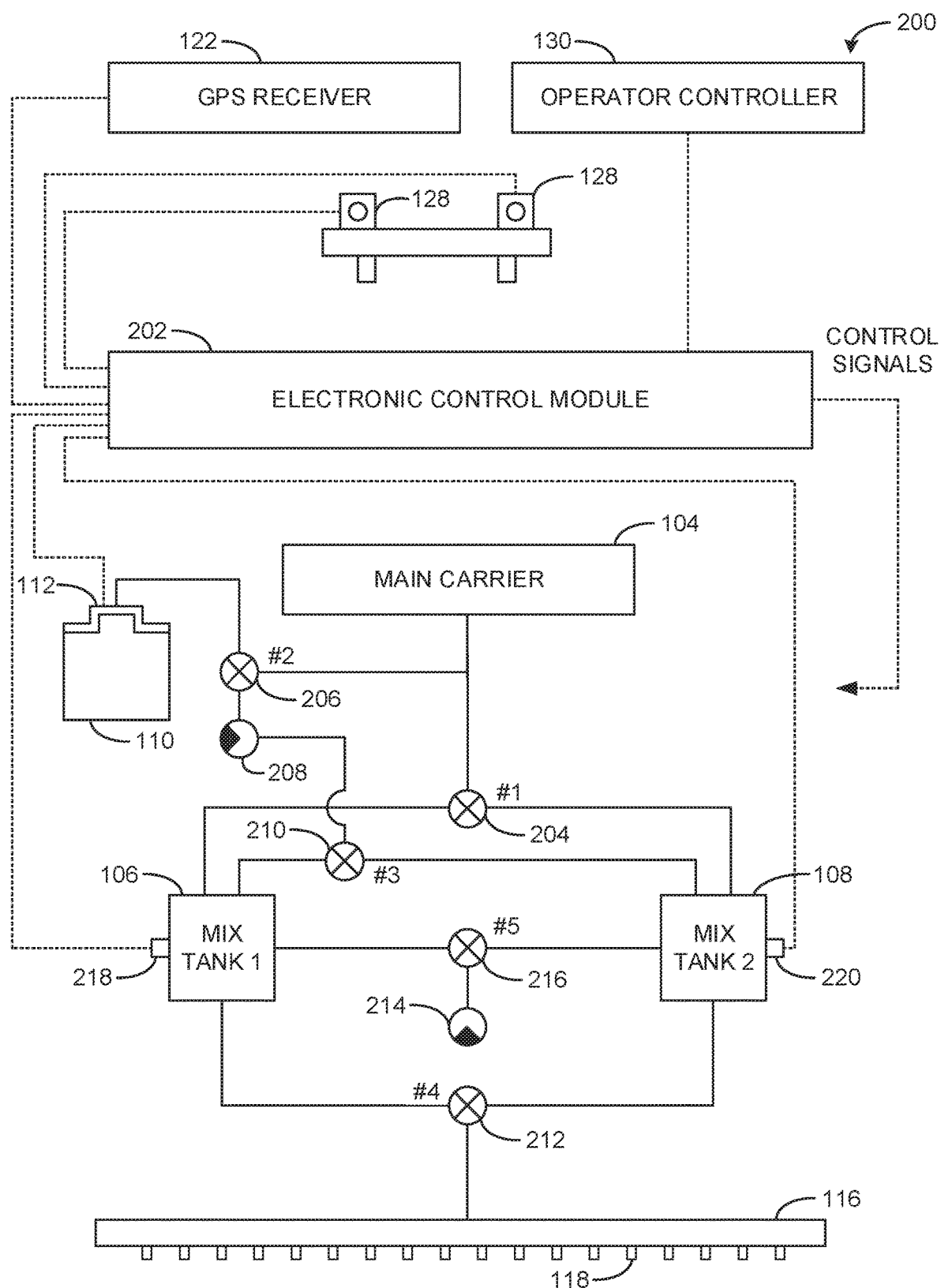
FIG. 2 is an example schematic of a spraying system of the tractor of FIGS. 1A-1B.

The example concentrate bottle 110 of the example tractor 100 is a storage container for a concentrate substance that is connected to the tractor 100. In some examples, the concentrate bottle 110 includes a weed spraying concentrate, a fertilization concentrate, or some other lawn treatment substance to be combined with a main carrier (e.g., water) and thereafter sprayed onto a lawn. In some examples, the concentrate bottle 110 is connected to a pump to pump the concentrate substance to the first mix tank 106 and/or the second mix tank 108 to create a lawn treatment mixture. An example configuration of a concentrate bottle 110 connected to a direct injection pump is illustrated in FIG. 2.

The example concentrate bottle top 112 of the example tractor 100 is a top (e.g., a cap, lid, etc.) to attach to the concentrate bottle 110. In some examples, the concentrate bottle top 112 is a universal top that is adjustable to fit with any concentrate bottle geometry that may be utilized in the lawn spraying system. In some examples, an adapter could be used with the concentrate bottle top 112 to connect to the concentrate bottle 110. In such examples, the concentrate bottle top 112 is continually connected to the tractor 100, and the concentrate bottle 110 is replaceable to enable use of a plurality of different concentrate substances with the lawn spraying system. Thus, concentrate substances can be easily replaced based on lawn requirements, without wasting any concentrate substance remaining in the concentrate bottle 110 after targeted spraying is complete. In some examples, the concentrate bottle 110 is purchased or obtained with its own concentrate bottle top, which is then removed and replaced with the concentrate bottle top 112 of the tractor 100. In some examples, the concentrate bottle top 112 can be detached from the concentrate bottle 110 and placed in a drain position to commence an auto-cleanout procedure. With the concentrate bottle top 112 in the drain position, valves can be opened to allow main carrier substance (e.g., water) to traverse the lines (e.g., pipes, hoses, etc.) connecting the main carrier tank 104 and the concentrate bottle top 112 to clean out these lines, thereby removing any remaining concentrate substance following a lawn treatment operation.

The example control assembly 114 of the example tractor 100 includes components to control the lawn spraying system of the tractor 100. In some examples, the control assembly 114 includes an electronic control module to identify spray targets, to monitor and control filling of the first and second mix tanks 106, 108, to actuate the nozzles 118 for spraying lawn treatment, to perform an auto-cleanout of the lawn spraying system, and/or to perform numerous other tasks. The control assembly 114 further includes a variety of valves, lines (e.g., hoses, pipes, etc.), pumps, and other components that can be controlled by the electronic control module. The control assembly 114 includes a plurality of connections to receive data (e.g., at the electronic control module) from the cameras 128, fluid level data for the first and second mix tanks 106, 108 and statuses of any valves and/or pumps that enable connections between the main carrier tank 104, the first mix tank 106, the second mix tank 108, the concentrate bottle 110, the boom 116, and/or the nozzles 118. A detailed schematic of a configuration of the aforementioned components that are included in the control assembly 114 and/or interact with the control assembly 114 is illustrated and described in association with FIG. 2.

The example boom 116 of the example tractor 100 is an elongated structure connected to the first mix tank 106 and the second mix tank 108. In some examples, the boom includes the nozzles 118 to enable spraying of the lawn treatment mixture. The boom 116 defines the limits of the lawn spraying system's spraying range. In some examples, the boom 116 extends the entire width of the tractor 100. In some examples, the boom 116 extends beyond the width of the tractor 100 for additional spraying range.

The example nozzles 118 are disposed on the boom 116 and enable precise spraying of targets with lawn treatment mixture from the first and second mix tanks 106, 108. The boom 116 can include any number of nozzles 118, with spraying precision improving with a higher number of the nozzles 118. For example, if the boom 116 includes ten nozzles spaced eight inches apart, spray targets can be more accurately sprayed than if the boom 116 includes five nozzles spaced at sixteen inches apart. This improvement in spraying precision by utilizing a plurality of individually-controllable nozzles provides efficiency improvements by utilizing less lawn treatment mixture while still providing coverage of the spray targets. In some examples, ones of the nozzles 118 include individual valves (e.g., valves specifically controlling flow to ones of the nozzles 118), to enable flow of the lawn treatment mixture through ones of the nozzles 118 when desired. The nozzles 118 can be oriented and/or directed in any direction (e.g., facing directly down toward the lawn treatment surface, facing down and away from the tractor 100, etc.). Ones of the nozzles 118 may be oriented in different directions. In some examples, the nozzles 118 may have spray patterns that are columnar, conical, hemispherical, and/or any other spray pattern shape.

In some examples, the components on the rear end 102 (e.g., the main carrier tank 104, the first mix tank 106, the second mix tank 108, the concentrate bottle 110, the control assembly 114, the boom 116, the nozzles 118, etc.) can be disposed in alternative positions on the tractor 100. For example, one or more of these components can be disposed on a left or right side of the tractor 100, or on the front end 120 of the tractor 100. Similarly, components on the front end 120 (e.g., the GPS receiver 122, the brush guard 124, the front bar 126, the cameras 128, etc.) can be disposed in alternative positions on the tractor 100. For example, the GPS receiver 122 could alternatively be disposed on the rear end 102 of the tractor 100.

The example GPS receiver 122 of the example tractor 100 receives location information (e.g., global positioning data) for the tractor 100. The GPS receiver 122 can store the location information, and/or transmit the location information to the control assembly 114 for storage and use in historical tracking of lawn treatments. The GPS receiver 122 can be any hardware and/or software capable of determining a location of the tractor 100. In some examples, the GPS receiver 122 is enabled when an operator selects an auto-spray function, to enable automatic tracking of locations of sprayed targets. In some examples, the GPS receiver 122 can be enabled or disabled independently of the auto-spray functionality, such as by the enabling a "target mapping" mode. In some examples, the GPS receiver 122 can calculate speed data to aid in determining when lawn treatment should be sprayed. In some examples, in addition or alternatively to the tractor 100 including the GPS receiver 122, the tractor 100 can include a speed sensor and/or a directional sensor (e.g., a steering angle sensor). For example, a position of the tractor 100 could be determined based on a speed from the speed sensor and a direction of the tractor 100 from the directional sensor. In some examples, the system may determine speed using visual odometry and/or radar.

The example brush guard 124 of the example tractor 100 is a structure mounted to the front end 120 of the tractor 100. In some examples, the brush guard 124 is attached to the tractor 100 to provide protection to the front end 120 of the tractor 100. In some examples, the brush guard 124 includes a front bar 126 to which the cameras 128 are mounted. In some examples, the front bar 126 that can be used for attaching the cameras 128 or other accessories is a separate component from the brush guard 124, and is instead directly connected to the front end 120.

The example cameras 128 of the example tractor 100 are mounted to the front bar 126 and angled to capture images of the lawn ahead of the tractor 100 to identify targets approaching the tractor 100. In the illustrated example of FIG. 1A, only one of the cameras 128 is visible. In some examples, the cameras 128 may be a single camera. In some examples, the cameras 128 are in communication with the control assembly 114 to enable processing of images captured by the cameras 128 to identify targets. In some examples, the cameras 128 are enabled when an operator enables an auto-spray mode of the tractor 100. In some examples, the tractor 100 includes one or more of the cameras 128 mounted at the rear end 102 of the tractor 100 to monitor the nozzles 118 and close a feedback loop with the control assembly 114.

The example operator controller 130 of the example tractor 100 is a controller for an operator to control functions of the tractor 100, such as controlling a mode of the tractor 100. In some examples, the operator controller 130 is a panel built into the tractor 100, with buttons pertaining to different controls. In some examples, the operator controller 130 is a personal device (e.g., a smart phone, a tablet, a laptop, etc.) that is connected (e.g., via Wi-Fi, via Bluetooth, etc.) to the control assembly 114. In some examples, the operator controller 130 includes an interface to view data from the cameras 128, data from the GPS receiver 122, data from fluid level sensors, or data from any other components of the tractor 100. In some examples, the operator controller 130 enables an operator to put the lawn spraying system in an auto-spray mode, an auto-cleanout mode, a manual spray mode, or other operational modes. The operator controller 130 can additionally or alternatively allow the operator to enable or disable various components of the tractor 100 (e.g., disable the GPS receiver 122, disable the cameras 128, etc.). The operator controller 130 is in communication with an electronic control module which interprets and acts upon signals associated with the operator controller 130 and other sensors and actuators on the tractor 100.

Figure 1B:
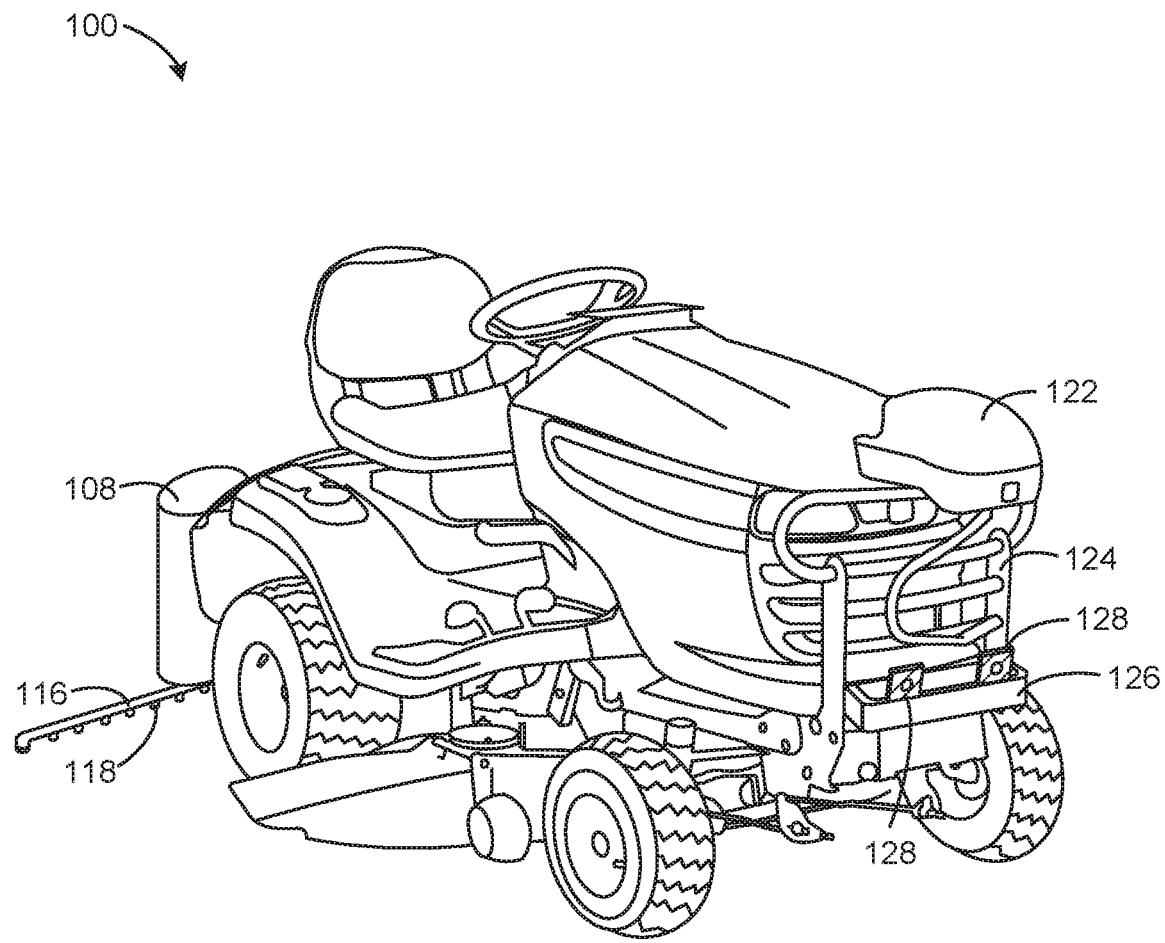
FIG. 1B is a front perspective view of the example tractor of FIG. 1A.

FIG. 1B is a front perspective view of the example tractor 100 of FIG. 1A. In the front perspective view, both of the cameras 128 are visible, as well as a full view of the GPS receiver 122. Further, the brush guard 124 and front bar 126 are fully visible. While the example tractor 100 of FIGS. 1A-1B depict two of the cameras 128, any numbers of cameras can be utilized.

Further, in the front perspective view of the tractor 100, the boom 116 is shown to extend beyond the width of the tractor 100. This extension can be beneficial to enabling a large spray area, resulting in fewer pass-overs of a lawn being required to effectively apply lawn treatment. The geometry of the nozzles 118 is additionally clearly shown, with the nozzles 118 protruding downward toward a lawn surface from the boom 116.

FIG. 2 is an example schematic of an example lawn spraying system 200 of the tractor 100 of FIGS. 1A-1B. The lawn spraying system 200 includes some components visible in the rear perspective view of the tractor 100 of FIG. 1A and/or visible in the front perspective view of the tractor 100 of FIG. 1B (e.g., the main carrier tank 104, the first mix tank 106, the second mix tank 108, the concentrate bottle 110, the boom 116, the nozzles 118, the GPS receiver 122 and the cameras 128). Further, the lawn spraying system 200 includes components not visible in the views of FIGS. 1A and 1B, such as components contained within the control assembly 114, or components obscured by other visible components.

The example lawn spraying system 200 of FIG. 2 includes an example electronic control module 202, an example first valve 204, an example second valve 206, an example direct injection pump 208, an example third valve 210, an example fourth valve 212, an example pneumatic pump 214, an example fifth valve 216, an example first fluid level sensor 218, and an example second fluid level sensor 220.

For clarity, components in the schematic of the lawn spraying system 200 are depicted using symbols and are not necessarily laid out in an orientation or grouping representative of the components' possible physical disposition on the tractor 100. In some examples, the electronic control module 202, the first valve 204, the second valve 206, the direct injection pump 208, the third valve 210, the fourth valve 212, the pneumatic pump 214, and the fifth valve 216 are contained within or directly around the control assembly 114 of the tractor 100 of FIGS. 1A-1B. However, these components are arranged in the schematic to be easily distinguishable and understandable while illustrating their interconnections and structures. Hence, the schematic is merely illustrative and does not limit the structural possibilities of the lawn spraying system 200.

The example electronic control module 202 of the lawn spraying system 200 processes data inputs from components of the lawn spraying system 200 and provides control signals to components of the lawn spraying system 200. In some examples, the electronic control module 202 processes image data inputs from the cameras 128 to identify spray targets in the lawn. In some examples, the electronic control module 202 accesses GPS data from the GPS receiver 122 to store location information associated with spray targets. In some examples, the electronic control module 202 generates, updates, and utilizes maps of spray targets to track times, locations, and/or other data associated with targets that have been sprayed with lawn treatment mixture. In some examples, the electronic control module 202 processes fluid level data from the first and second fluid level sensors 218, 220 to determine lawn treatment mixture levels associated with the first mix tank 106 and the second mix tank 108. The example electronic control module 202 can utilize the lawn treatment mixture levels to determine when the first mix tank 106 and/or the second mix tank 108 should be filled, should be pressurized, and/or should be utilized to supply the boom 116 and ultimately the nozzles 118 with lawn treatment mixture. In some examples, to enable preparation and spraying of the lawn treatment mixture, the electronic control module 202 issues control signals to the first valve 204, the second valve 206, the direct injection pump 208, the third valve 210, the fourth valve 212, the pneumatic pump 214, and the fifth valve 216. In some examples, the electronic control module 202 issues control signals to individual ones of the nozzles 118, or solenoid valves associated with the nozzles 118, to enable targeted spraying of the lawn treatment mixture.

In some examples, the electronic control module 202 can receive speed data from the GPS receiver 122. For example, the GPS receiver 122 can provide data indicating how fast the tractor 100 is traveling to assist the electronic control module 202 in determining whether to slow down the tractor 100 to ensure that the spray target can be sprayed. In some examples, the electronic control module 202 can utilize the speed data to determine a time to begin and terminate spraying of the spray target based on the current speed of the tractor 100. In some examples, the electronic control module 202 can also receive data from other sensors, such as a concentrate top sensor, which could indicate whether the concentrate bottle top 112 is secured to the concentrate bottle 110 (e.g., containing the concentrate). This could be utilized as a safety feature, as well as to indicate when the top of the concentrate bottle top 112 is not fastened to the concentrate bottle 110, which may be desirable when performing an auto-cleanout procedure.

In some examples, the electronic control module 202 receives control mode selection data based from the operator controller 130. For example, the electronic control module 202 can, in response to receive control mode selection data indicating that an auto-spray mode has been selected, initiate spray target recognition, lawn treatment mixture preparation, and spraying. Further detail of the electronic control module 202 is illustrated and described in association with FIG. 3.

The example first valve 204 of the lawn spraying system 200 controls a connection between the main carrier tank 104 and the first mix tank 106 and the second mix tank 108. In some examples, the first valve 204 is a three-way valve, enabling connection of the main carrier tank 104 to one of the first mix tank 106 or the second mix tank 108 at a given time. In such examples, main carrier substance can be supplied to one of the first mix tank 106 or the second mix tank 108, while the other one of the first and second mix tanks 106, 108 can be pressurized and sprayed onto identified targets, assuming sufficient lawn treatment mixture levels. In some examples, the first valve 204 is actuated by the electronic control module 202 to control filling of the first mix tank 106 and/or the second mix tank 108. In some examples, the first valve 204 can be positioned to disable connection to both the first and second mix tanks 106, 108, such as, for example, if both the first and second mix tanks 106, 108 are full (e.g., the first and second mix tanks 106, 108 satisfy a fluid level threshold according to the respective first fluid level sensor 218 and the second fluid level sensor 220).

The example second valve 206 of the lawn spraying system 200 controls a connection between the main carrier tank 104, the concentrate bottle 110, and the direct injection pump 208. In some examples, the second valve 206 is a three-way valve, enabling connection of the concentrate bottle 110 to the direct injection pump 208 to supply the first and second mix tanks 106, 108 with concentrate substance, or enabling connection of the main carrier tank 104 to the line feeding the concentrate bottle 110 or the line including the direct injection pump 208 to enable cleaning of these lines. For example, during an automatic clean-out operation, the second valve 206 can be actuated to connect the main carrier tank 104 to the line that connects to the concentrate bottle 110. When the concentrate bottle top 112 is removed from the concentrate bottle 110, and the second valve 206 is in this clean-out position, main carrier can flow (e.g., via gravity) out the concentrate bottle top 112 to clean out this line. In some examples, the second valve 206 is actuated by the electronic control module 202 based on whether an operator has selected a lawn treatment spraying mode or an auto-cleanout mode.

The example direct injection pump 208 of the lawn spraying system 200 pumps concentrate substance from the concentrate bottle 110 through a line connected to the first and second mix tanks 106, 108. In some examples, unlike the main carrier substance, which in some examples flows due to gravity to the first and second mix tanks 106, 108, the higher viscosity of the concentrate substance and the positioning of the concentrate bottle 110 necessitates pumping to supply the concentrate substance to the first and second mix tanks 106, 108. In some examples, the electronic control module 202 controls the direct injection pump 208, enabling pumping of the concentrate substance when lawn treatment mixture is to be prepared.

The example third valve 210 of the lawn spraying system 200 controls a connection between the line supplying concentrate substance and the first and second mix tanks 106, 108. In some examples, the third valve 210 is a three-way valve that can be actuated to connect the line supplying concentrate substance to the first mix tank 106, to connect the line supplying concentrate substance to the second mix tank 108, or to connect the first and second mix tanks 106, 108 (e.g., effectively representing an "off" state with no concentrate substance flowing through the connection). For example, if there is not a need to produce lawn treatment mixture (e.g., due to the spray mode being disabled, due to the first and second mix tanks 106, 108 having sufficient lawn treatment mixture, etc.), the third valve 210 can be placed in the state connecting the first and second mix tanks 106, 108 (e.g. the "off" state). In some examples, the third valve 210 is actuated by the electronic control module 202 to control supply of the concentrate substance to the first mix tank 106 and the second mix tank 108.

The example fourth valve 212 of the lawn spraying system 200 controls a connection between the first and second mix tanks 106, 108 and the boom 116. In some examples, the fourth valve 212 is a three-way valve, enabling connection of the first mix tank 106 or the second mix tank 108 to the boom 116. In some examples, the fourth valve 212 includes an off state, wherein neither the first mix tank 106 nor the second mix tank 108 are connected to the boom 116 (e.g., when the lawn spraying system 200 is not in a spray mode).

In some examples, the electronic control module 202 actuates the first valve 204, the second valve 206, the third valve 210, and the fourth valve 212 in response to (1) a mode of the lawn spraying system 200 (e.g., "off," "auto-spray," "auto-cleanout," etc.), (2) fluid level data from the first fluid level sensor 218 and the second fluid level sensor 220, and/or (3) whether the first mix tank 106 or the second mix tank 108 is supplying lawn treatment mixture to the boom 116. The electronic control module 202 further actuates the pneumatic pump 214 and the fifth valve 216 in response to (1) the mode of the lawn spraying system 200, (2) a filling status associated with the first mix tank 106 or the second mix tank 108, and/or (3) fluid level data from the first fluid level sensor 218 and the second fluid level sensor 220.

The example pneumatic pump 214 of the lawn spraying system 200 enables pressurization of the first mix tank 106 and the second mix tank 108. In some examples, when filling of the first mix tank 106 or the second mix tank 108 is complete (e.g., as indicated by fluid level data associated with the first fluid level sensor 218 or the second fluid level sensor 220), the electronic control module 202 can indicate that the filled mix tank is ready to be pressurized by the pneumatic pump 214. In some examples, in addition to or alternatively to using the pneumatic pump 214 to pressurize the first mix tank 106 and the second mix tank 108, the tractor 100 can include a pump (e.g., an electric driven liquid pump) downstream from the fourth valve 212 to pressurize the lawn treatment mixture to be sprayed by the nozzles 118.

In some examples, the pneumatic pump 214 is connected to the fifth valve 216 of the lawn spraying system 200, which controls whether the pneumatic pump 214 pressurizes the first mix tank 106 or the second mix tank 108. In some examples, the fifth valve 216 is a three-way valve, capable of connecting the pneumatic pump 214 to the first mix tank 106, the pneumatic pump 214 to the second mix tank 108, or connecting the first and second mix tanks 106, 108 (e.g., representing an "off" state where the pneumatic pump 214 is not connected to either of the first mix tank 106 or the second mix tank 108). In some examples, instead of, or in addition to utilizing the fifth valve 216, two separate lines can be utilized, one connecting the pneumatic pump 214 to the first mix tank 106 and one connecting the pneumatic pump 214 to the second mix tank 108.

The example first fluid level sensor 218 of the lawn spraying system 200 captures data on a lawn treatment mixture quantity in the first mix tank 106. In some examples, the first fluid level sensor 218 provides continuous fluid level data corresponding to a specific height of fluid (e.g., lawn treatment mixture) in the first mix tank 106. In some examples, the first fluid level sensor 218 can be one or more discrete sensors providing an indication of whether the height of the fluid is at a certain level (e.g., an upper and lower bound). For example, the first fluid level sensor 218 can include a discrete sensor near the bottom of the first mix tank 106 to indicate when a fluid level in the first mix tank 106 does not satisfy a lower fill threshold, and is thus insufficient for the first mix tank 106 to supply the boom 116 with lawn treatment mixture, and to indicate when the first mix tank 106 should be filled. In some examples, the first fluid level sensor 218 can additionally or alternatively include a discrete sensor near an upper portion of the first mix tank 106 to indicate when a fluid level in the first mix tank 106 satisfies an upper fill threshold and is thus sufficient to cease filling of the first mix tank 106 and begin utilizing the first mix tank 106 to supply the boom 116 with lawn treatment mixture. In some examples, the first fluid level sensor 218 provides fluid level data to the electronic control module 202 to enable control decisions pertaining to filling of the first mix tank 106, pressurization of the first mix tank 106, and/or utilization of the lawn treatment mixture in the first mix tank 106 for spraying targets.

The example second fluid level sensor 220 of the lawn spraying system 200 provides fluid level sensing data pertaining to the second mix tank 108. In some examples, the second fluid level sensor 220 is similar to the first fluid level sensor 218, to provide consistency in the type and format of data reported for the first mix tank 106 and the second mix tank 108. The example second fluid level sensor 220 can be any type of fluid level or other type of sensor to determine a quantity of lawn treatment mixture in the second mix tank 108. As is the case with the first fluid level sensor 218, the second fluid level sensor 220 can be one or more continuous fluid level sensors, or one or more discrete fluid level sensors. In some examples, the second fluid level sensor 220 provides fluid level data to the electronic control module 202 to enable control decisions pertaining to filling of the second mix tank 108, pressurization of the second mix tank 108, and/or utilization of the lawn treatment mixture in the second mix tank 108 for spraying targets.

Figure 3:
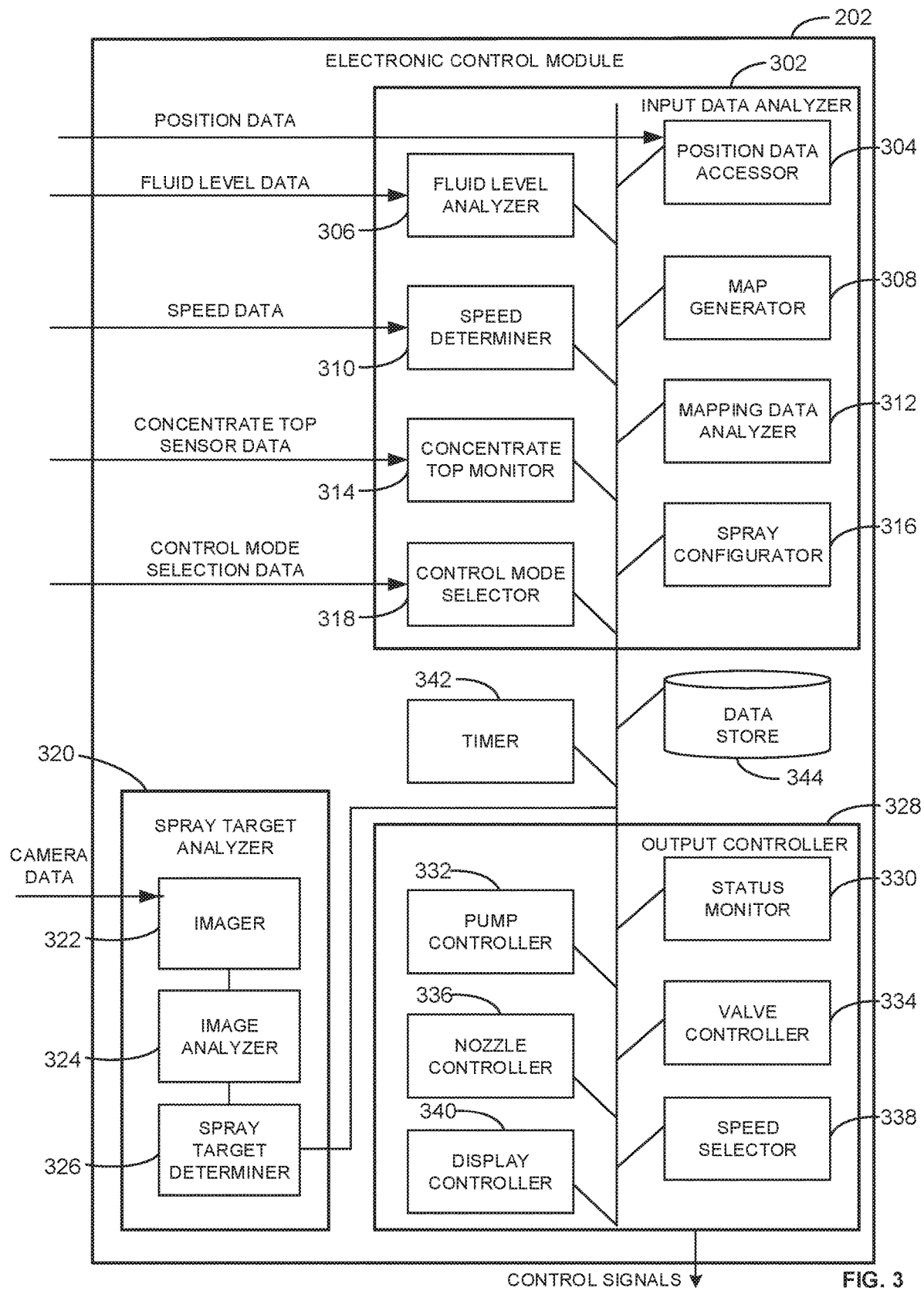
FIG. 3 is a block diagram an example electronic control module constructed in accordance with the teachings of this disclosure.

FIG. 3 is a block diagram of the example electronic control module 202 constructed in accordance with the teachings of this disclosure. The electronic control module 202 includes an example input data analyzer 302, which includes an example position data accessor 304, an example fluid level analyzer 306, an example map generator 308, an example speed determiner 310, an example mapping data analyzer 312, an example concentrate top monitor 314, an example spray configurator 316, and an example control mode selector 318. The example electronic control module 202 further includes an example spray target analyzer 320, which includes an example imager 322, an example image analyzer 324, and an example spray target determiner 326. The electronic control module 202 also includes an example output controller 328, including an example status monitor 330, an example pump controller 332, an example valve controller 334, an example nozzle controller 336, an example speed selector 338, and an example display controller 340. The example electronic control module 202 additionally includes an example timer 342 and an example data store 344.

The example input data analyzer 302 of the illustrated example of FIG. 3 accesses data associated with input devices (e.g., sensors, controllers, etc.) of the tractor 100. The input data analyzer 302 can access position data (e.g., from the GPS receiver 122, derived from data from a speed sensor and a directional sensor, etc.) and speed data (e.g., from the GPS receiver 122, from a speed sensor such as a wheel speed sensor, etc.), fluid level data from the first and second fluid level sensors 218, 220, concentrate top sensor data from a sensor associated with the concentrate bottle top 112, control mode selection data from the operator controller 130, and/or data associated with statuses of the valves (e.g., the first, second, third, fourth, and fifth valves 204, 206, 210, 212, 216) associated with the lawn spraying system 200, the pneumatic pump 214, and/or the direct injection pump 208. In some examples, the input data analyzer 302 can access data associated with other sensors and/or actuators on the tractor 100 (e.g., a proximity sensor, a gyroscope, thermometers, etc.). In some examples, the input data analyzer 302 performs processing tasks on input data to enable decisions by the output controller 328. The input data analyzer 302 can work in conjunction with the spray target analyzer 320, which can serve as an input data analyzer specifically for image data from the cameras 128.

The example position data accessor 304 of the illustrated example of FIG. 3 accesses position data from the GPS receiver 122. In some examples, the position data accessor 304 continually accesses position data from the GPS receiver 122. In some examples, the position data accessor 304 accesses position data in response to (1) the control mode of the tractor 100 (e.g., a mode of the lawn spraying system 200) being set to an auto-spray mode, and/or (2) a spray target mapping functionality being enabled. The position data accessor can determine a control mode of the tractor 100 via the control mode selector 318, and/or can determine whether a mapping functionality is enabled via the map generator 308 and/or the mapping data analyzer 312. In some examples, the position data accessor 304 stores position data to the data store 344. In some examples, the position data accessor 304 provides position data to the spray configurator 316 to determine times to spray a target (e.g., a first time to start spraying and a second time to conclude spraying) based on a current position of the tractor 100, and/or to determine which nozzles should be utilized to spray a target based on a current position of the tractor 100 compared to a target.

The example fluid level analyzer 306 of the illustrated example of FIG. 3 accesses fluid level data from the first and second fluid level sensors 218, 220. In some examples, the fluid level analyzer 306 is enabled to monitor and analyze fluid level data whenever the control mode of the tractor 100 is in an auto-spray mode and/or an auto-cleanout mode. In some examples, the fluid level analyzer 306 analyzes the fluid level data to determine whether lawn treatment mixture in the first mix tank 106 and/or the second mix tank 106 satisfies a lower fill threshold (e.g., representing a minimum lawn treatment mixture level required to dispense the lawn treatment mixture from the respective mix tank) and/or satisfies an upper fill threshold (e.g., representing a lawn treatment mixture level at which the mix tank is sufficiently filled to begin dispensing the lawn treatment mixture). In some examples, the fluid level analyzer 306, in conjunction with the control mode selector 318 and the status monitor 330 enable the electronic control module 202 to determine whether to fill and/or dispense lawn treatment mixture from the first mix tank 106 or the second mix tank 108. In some examples, the fluid level data itself indicates whether a lower fill threshold and/or an upper fill threshold are satisfied, based on the first fluid level sensor 218 and/or the second fluid level sensor 220 including discrete sensors positioned at upper and lower fill threshold levels. Additionally or alternatively, the fluid level data can be continuous data representing a specific fluid level value, which the fluid level analyzer 306 can then compare against the upper and lower fill thresholds.

The example map generator 308 of the illustrated example of FIG. 3 generates maps of spray targets utilizing position data and spray target data. In some examples, the map generator 308 can be enabled or disabled based on an operator enabling or disabling a mapping mode. The map generator 308 can monitor spray targets that are sprayed by monitoring the spray target determiner 326 and/or the spray configurator 316, and subsequently storing the spray targets in association with position data accessed by the position data accessor 304 at a time when the target is sprayed. The map generator 308 can store a time in association with the spray target and its location by accessing the time from the timer 342, thereby enabling future decisions as to whether the same spray target should be sprayed based on an elapsed time since the previous spray operation. In some examples, the map generator 308 stores images from the cameras 128 in association with the spray target to enable future comparison of new images of the spray target with prior images of the spray target. Such comparison can enable intelligent decision making with respect to whether to continue spraying a target and/or how often to continue spraying the target. The map generator 308 can store the map of spray targets in the data store 344, or in another storage location accessible by the mapping data analyzer 312.

The example speed determiner 310 of the illustrated example of FIG. 3 accesses speed data from the GPS receiver 122. In some examples, the speed determiner 310 can access speed data from a different sensor or data source on the tractor 100 (e.g., a speedometer, a speed sensor, etc.). In some examples, the speed data is directly accessed from the GPS receiver 122, while in some examples the speed data is calculated based on position and time data accessed from the GPS receiver 122. In some examples, the speed determiner 310 provides speed data to the speed selector 338 to provoke adjustment of the speed of the tractor 100 (e.g., to enable more effective/precise lawn treatment spraying). In some examples, the speed determiner 310 provides speed data to the spray configurator 316 to enable the spray configurator to set spray parameters based on the current speed of the tractor 100.

The example mapping data analyzer 312 of the illustrated example of FIG. 3 compares newly detected spray targets against the map generated by the map generator 308. In some examples, when the spray target determiner 326 identifies a spray target ahead of the tractor 100, the mapping data analyzer 312 is queried to determine whether the spray target has been previously sprayed, based on its location. In some examples, the mapping data analyzer 312 can determine whether the spray target has been previously sprayed based on additional parameters, such as a combination of location data and images captured of previously sprayed targets. The mapping data analyzer 312 can additionally determine whether a spray target that has been previously sprayed requires spraying at the current time based on a spraying schedule. For example, the mapping data analyzer 312 can access parameters for various types of targets (e.g., dandelions, crab grass, etc.), including recommended spray frequencies. When a spray target is identified by the spray target determiner 326, and the mapping data analyzer 312 determines that the spray target has been previously sprayed, the mapping data analyzer 312 can further determine whether the previous spraying was recent enough that the target should not be sprayed again at the current time, based on the type of spray target that was identified. In some examples, when the operator disables the mapping capabilities of the lawn spraying system 200, the mapping data analyzer 312 can be bypassed and/or disabled. In some examples, the mapping data analyzer 312 can analyze maps of spray targets to generate, update, and/or deliver proactive schedules to the operator regarding appropriate times to perform an auto-spray operation on the lawn. For example, if the operator requests a schedule to be displayed, the mapping data analyzer 312 can analyze the nearby targets that have been sprayed in a recent time period (e.g., thirty days) within a threshold position of the current position of the tractor 100 (e.g., within one hundred meters) and provide data pertaining to an appropriate time to return to spray the previously encountered spray targets.

The example concentrate top monitor 314 of the illustrated example of FIG. 3 accesses concentrate top sensor data associated with the concentrate bottle top 112. In some examples, the concentrate top monitor 314 accesses an indication of whether the concentrate bottle top 112 is attached to a concentrate bottle (e.g., the concentrate bottle 110). In some examples, the concentrate top monitor 314 additionally or alternatively accesses an indication as to whether the concentrate top monitor 314 is free (e.g., not attached to a bottle) or is placed in a drain position (e.g., to enable main carrier substance to flow through and out of the concentrate bottle top 112).

The example spray configurator 316 of the illustrated example of FIG. 3 determines spray configuration settings based on identified spray targets and parameters of the lawn spraying system 200. In some examples, the spray configurator 316 is enabled when the control mode selector 318 indicates that the tractor 100 is in an auto-spray mode. The spray configurator 316 can, in response to the spray target determiner 326 identifying an upcoming spray target (e.g., a target in front of the tractor 100), determine, based on indications from the fluid level analyzer 306, whether fluid level data associated with the first mix tank 106 or the second mix tank 108 satisfies an upper fill threshold (e.g., associated with a "full" fluid level) and thus should be utilized to supply the boom 116 with lawn treatment mixture. Further, the spray configurator 316 can determine, based on a location of the spray target, which of the nozzles 118 should be actuated, and, based on data from the speed determiner 310, when the nozzles should be actuated to spray the target. The spray configurator 316 can supply signals to the pump controller 332, the valve controller 334, and the nozzle controller 36 to actuate components to either supply concentrate substance and main carrier substance to the first mix tank 106, the second mix tank 108, and/or to supply the boom 116 with lawn treatment mixture from the first mix tank or the second mix tank 108.

The example control mode selector 318 of the illustrated example of FIG. 3 accesses control mode selection data from the operator controller 130. For example, the control mode selector 318 can receive data that the operator has elected for the tractor 100 to operate in an auto-spray mode, an auto-cleanout mode, a manual spray mode, a spray disabled mode, etc. The control mode selector 318 can also access signals to indicate whether features such as mapping are to be enabled. In some examples, the control mode selector 318 receives other mode selections and/or more detailed control mode selection data including specific component commands (e.g., enable the cameras, disable the GPS receiver, etc.). In response to accessing control mode selection data, the control mode selector 318 communicates with the spray configurator 316, the map generator 308, the spray target analyzer 320, and/or the output controller 328 to enable or disable functions associated with different control modes. For example, in response to an operator selecting the auto-spray control mode, the control mode selector 318 can enable the spray target analyzer 320, enable the map generator 308, enable the mapping data analyzer 312, and/or enable any other components of the electronic control module 202 to facilitate automatic lawn treatment spraying.

The example spray target analyzer 320 of the illustrated example of FIG. 3 receives camera data from the cameras 128 and processes the camera data to identify spray targets on the lawn. The spray target analyzer 320 can receive camera data in any format, and then sample the camera data to obtain images at an appropriate frequency (e.g., based on the speed of travel of the tractor 100, the configuration of the spray target analyzer 320, etc.). In some examples, the spray target analyzer 320 analyzes images for known parameters (e.g., shapes, textures, etc.) associated with weeds or other spray targets. In some examples, the spray target analyzer 320 analyzes multiple consecutive images as verification of a candidate spray target. In some examples, the spray target analyzer 320 includes machine learning elements, whereby a neural network is trained to identify common spray targets and subsequently compare image data from the cameras 128 against the neural network model to determine whether one or more spray targets are present in the image data.

The example imager 322 of the illustrated example of FIG. 3 accesses raw or processed camera data from the cameras 128. In some examples, the imager 322 samples the camera data at an appropriate rate based on a speed of the tractor 100, and/or based on a configuration of the spray target analyzer 320. For example, if the tractor 100 is moving at a relatively fast speed, it may be desirable for the imager 322 to sample the camera data at a higher rate to ensure that spray targets are identified with sufficient time to process the spray targets and to actuate components for spraying. In some examples, the sample rate associated with the imager 322 is constrained based on hardware capabilities (e.g., memory availability, processing capabilities, etc.).

The example image analyzer 324 analyzes images to identify shapes, patterns, textures, and other characteristics of the images. In some examples, the image analyzer 324 groups different segments (e.g., sections) of the images based on colors and/or shapes associated with the segments. The image analyzer 324 can then subsequently analyze the segments to determine whether they represent a spray target (e.g., a weed, an under-fertilized area, etc.).

The example spray target determiner 326 operates in conjunction with the image analyzer 324 to identify spray targets based on the image analysis. For example, the spray target determiner 326 can compare a segment identified in the image analyzer 324 that has a specific shape, color, and/or texture with known shapes, colors, and/or textures associated with known spray targets (e.g., weeds). In some examples, the spray target determiner 326 utilizes image analyses associated with multiple consecutive images to identify a spray target with higher confidence. In some examples, in response to identifying a spray target, the spray target determiner 326 queries the mapping data analyzer 312 to determine whether the spray target has been sprayed previously within a threshold time. In some examples, the spray target determiner 326 provides information pertaining to the spray target (e.g., location, type of spray target, time, etc.) to the map generator 308 to add the spray target to the map. In some examples, the spray target determiner 326 provides information pertaining to the spray target to the spray configurator 316 for use in controlling components of the lawn spraying system 200 to spray the target.

The example output controller 328 of the illustrated example of FIG. 3 provides output signals to components of the lawn spraying system 200. In some examples, the output controller 328 further includes the status monitor 330 to track states associated with valves, pumps, and/or other components of the lawn spraying system 200. The output controller 328 accesses signals from the input data analyzer 302 and the spray target analyzer 320 and generates control signals based on the analyses of these components.

The example status monitor 330 tracks statuses of the components of the lawn spraying system 200. For example, the status monitor 330 can track statuses of the valves (e.g., the first valve 204, the second valve 206, the third valve 210, the fourth valve 212, the fifth valve 216, etc.) to determine which connections are currently available. The status monitor 330 can further track a status of the direct injection pump 208 to determine whether concentrate substance is being pumped to the first mix tank 106 and/or the second mix tank 108. In some examples, the status monitor 330 tracks a status of the pneumatic pump 214 to determine whether it is currently, or has previously, pressurized the first mix tank 106 and/or the second mix tank 108. In some examples, the status monitor 330 tracks statuses associated with the nozzles 118. The status monitor 330 can additionally or alternatively track any other actuatable component of the lawn spraying system 200.

The example pump controller 332 of the illustrated example of FIG. 3 issues control signals to actuate the direct injection pump 208 and/or the pneumatic pump 214. In some examples, the pump controller 332 turns on the pneumatic pump 214 to pressurize one of the first mix tank 106 or the second mix tank 108 in response to the fluid level analyzer 306 determining that a fluid level of the respective mix tank satisfies an upper fill threshold. In some examples, the pump controller 332 turns on the direct injection pump 208 in response to a signal to fill the first mix tank 106 or the second mix tank 108. In some examples, the pump controller 332 is responsive to a signal from the control mode selector 318. For example, in response to the control mode selector 318 indicating that the lawn spraying system 200 is operating in an auto-spray mode, the pump controller 332 can issue signals to ensure that the pneumatic pump 214 pressurizes the first and second mix tanks 106, 108 once they are filled, and that the direct injection pump 208 pumps concentrate substance to the first and second mix tanks 106, 108 during filling.

The example valve controller 334 of the illustrated example of FIG. 3 issues control signals to the first valve 204, the second valve 206, the third valve 210, the fourth valve 212, and/or the fifth valve 216 of the lawn spraying system 200. In some examples, the valve controller 334 receives signals from the spray configurator 316 to determine when the fourth valve 212 should be actuated to supply lawn treatment mixture to the boom 116. In some examples, the valve controller 334 accesses signals from the fluid level analyzer 306 and the control mode selector 318 to actuate the first valve 204, the second valve 206, the third valve 210, and/or the fifth valve 216. For example, in response to the first fluid level sensor 218 of the first mix tank 106 indicating that a fluid level of the first mix tank 106 is at an upper fill threshold during a filling operation, filling is ceased by actuating the first valve 204 and the third valve 210 to stop flow of concentrate substance and main carrier substance into the first mix tank 106, and the fifth valve 216 is actuated to connect the pneumatic pump 214 to the first mix tank 106 to pressurize the first mix tank 106.

The example nozzle controller 336 of the illustrated example of FIG. 3 issues control signals for the nozzles 118. For example, the nozzle controller 336 can access a signal from the spray configurator 316 indicating parameters for a spray operation, such as which ones of the nozzles 118 should be actuated, and at what time the nozzles should be actuated. To determine when to open or close ones of the nozzles 118, the nozzle controller 336 compares a time tracked by the timer 342 to the spray start time indicated by the spray configurator. Similarly, the valve controller 334 can cease a spray operation when the timer 342 indicates a time corresponding to an end time for the spray operation (e.g., as indicated by the spray configurator 316). In some examples, the nozzle controller 336 issues signals that actuate solenoid valves that are associated with ones of the nozzles 118, which enable lawn treatment mixture that is flowing to the boom 116 to exit through nozzles.

The example speed selector 338 of the illustrated example of FIG. 3 issues control signals to adjust a travel speed of the tractor 100. In some examples, the speed selector 338 can adjust a speed of the tractor 100 in response to a signal from the spray configurator 316, the control mode selector 318, and/or the speed determiner 310. For example, in response to the control mode selector 318 indicating that the tractor 100 is operating in an auto-spray mode, the speed selector 338 can adjust the speed of the tractor 100 to be relatively slow to enable precise spraying and to allow time for target identification by the spray target analyzer 320. In some examples, the spray target analyzer 320 can issue a signal to the speed selector 338 to slow down the tractor 100 if more time is required to process the camera data to identify spray targets.

The example display controller 340 of the illustrated example of FIG. 4 issues signals to provide information on a display of the operator controller 130, or another display device accessible to the operator. For example, the display controller 340 can provide speed data, position data, spray configuration data, mapping data, image analysis data, target analysis data, spray scheduling data, as well as component-level data (e.g., maintenance data, current states of components, etc.) to the display of the operator controller 130. In some examples, the display controller 340 provides such information to a mobile device of the operator (e.g., a cell phone, a tablet, etc.). The display controller 340 can additionally or alternatively issue signals to provide instructions to the operator on the display of the operator controller 130. For example, when control mode selection data indicating an auto-cleanout mode is accessed by the control mode selector 318, the display controller 340 can issue instructions to the operator to place the concentrate bottle top 112 over a drain, to drive the tractor 100 into an open area, etc. The display controller 340 can also update these instructions based on information from the concentrate top monitor 314, the fluid level analyzer 306, and/or other components of the input data analyzer 302.

While an example manner of implementing the electronic control module 202 of FIG. 2 is illustrated in FIG. 3, one or more of the elements, processes and/or devices illustrated in FIG. 3 may be combined, divided, re-arranged, omitted, eliminated and/or implemented in any other way. Further, the example input data analyzer 302, the example position data accessor 304, the example fluid level analyzer 306, the example map generator 308, the example speed determiner 310, the example mapping data analyzer 312, the example concentrate top monitor 314, the example spray configurator 316, the example control mode selector 318, the example spray target analyzer 320, the example imager 322, the example image analyzer 324, the example spray target determiner 326, the example output controller 328, the example status monitor 330, the example pump controller 332, the example valve controller 334, the example nozzle controller 336, the example speed selector 338, the example display controller 340, the example timer 342, the example data store 344 and/or, more generally, the example electronic control module 202 of FIG. 3 may be implemented by hardware, software, firmware and/or any combination of hardware, software and/or firmware. Thus, for example, any of the example input data analyzer 302, the example position data accessor 304, the example fluid level analyzer 306, the example map generator 308, the example speed determiner 310, the example mapping data analyzer 312, the example concentrate top monitor 314, the example spray configurator 316, the example control mode selector 318, the example spray target analyzer 320, the example imager 322, the example image analyzer 324, the example spray target determiner 326, the example output controller 328, the example status monitor 330, the example pump controller 332, the example valve controller 334, the example nozzle controller 336, the example speed selector 338, the example display controller 340, the example timer 342, the example data store 344 and/or, more generally, the example electronic control module 202 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input data analyzer 302, the example position data accessor 304, the example fluid level analyzer 306, the example map generator 308, the example speed determiner 310, the example mapping data analyzer 312, the example concentrate top monitor 314, the example spray configurator 316, the example control mode selector 318, the example spray target analyzer 320, the example imager 322, the example image analyzer 324, the example spray target determiner 326, the example output controller 328, the example status monitor 330, the example pump controller 332, the example valve controller 334, the example nozzle controller 336, the example speed selector 338, the example display controller 340, the example timer 342, the example data store 344 and/or, more generally, the example electronic control module 202 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic control module 202 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the electronic control module 202 of FIG. 3 is shown in FIGS. 4A-4B, 5A-5B, 6, 7, and 8A-8B. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 4A-4B, 5A-5B, 6, 7, and 8A-8B, many other methods of implementing the example electronic control module 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4A-4B, 5A-5B, 6, 7, and 8A-8B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 4A:
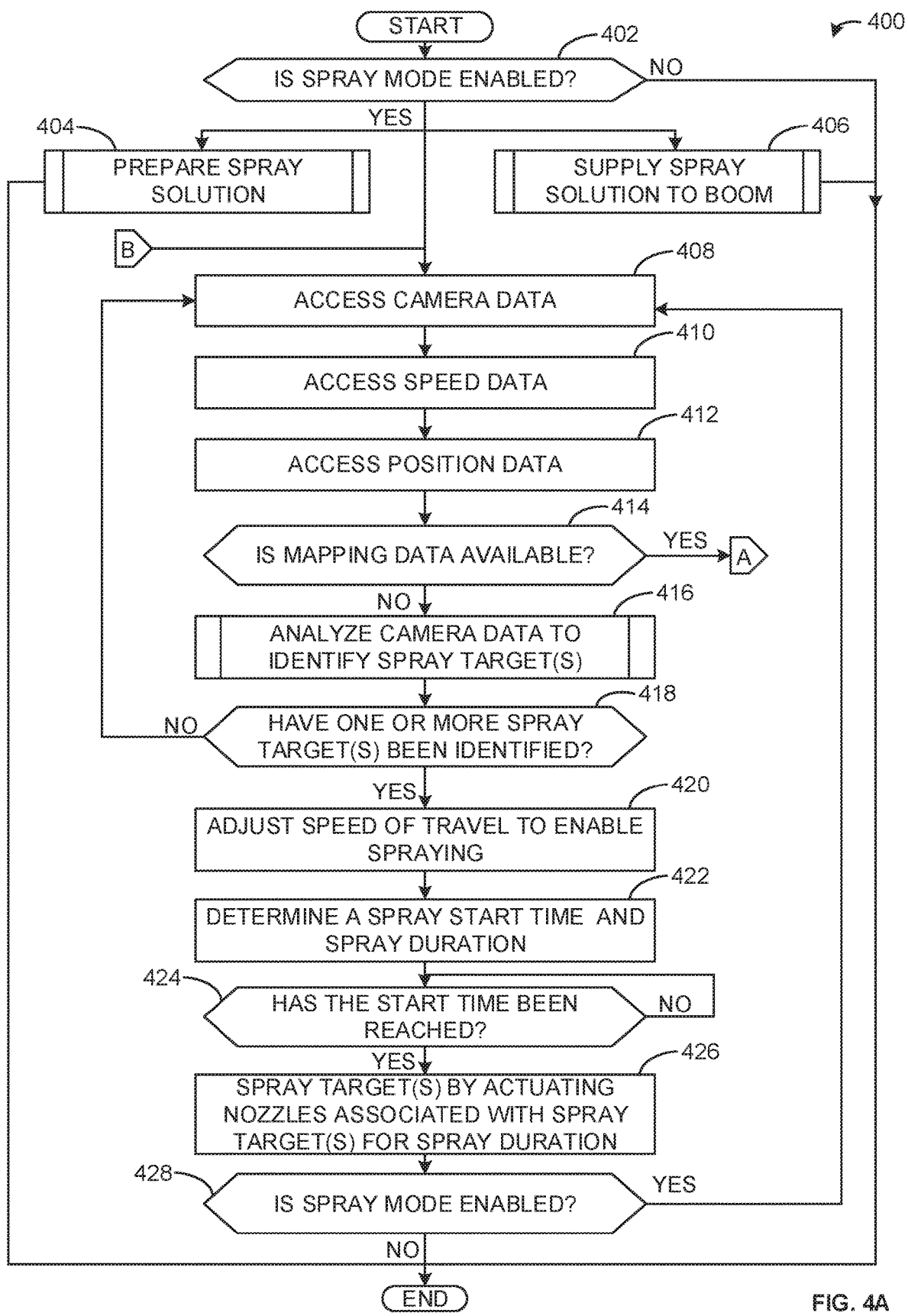
FIGS. 4A-4B form a flowchart representative of example machine readable instructions which may be executed to implement the spraying system of FIG. 2 for efficient material application.
Figure 4B:
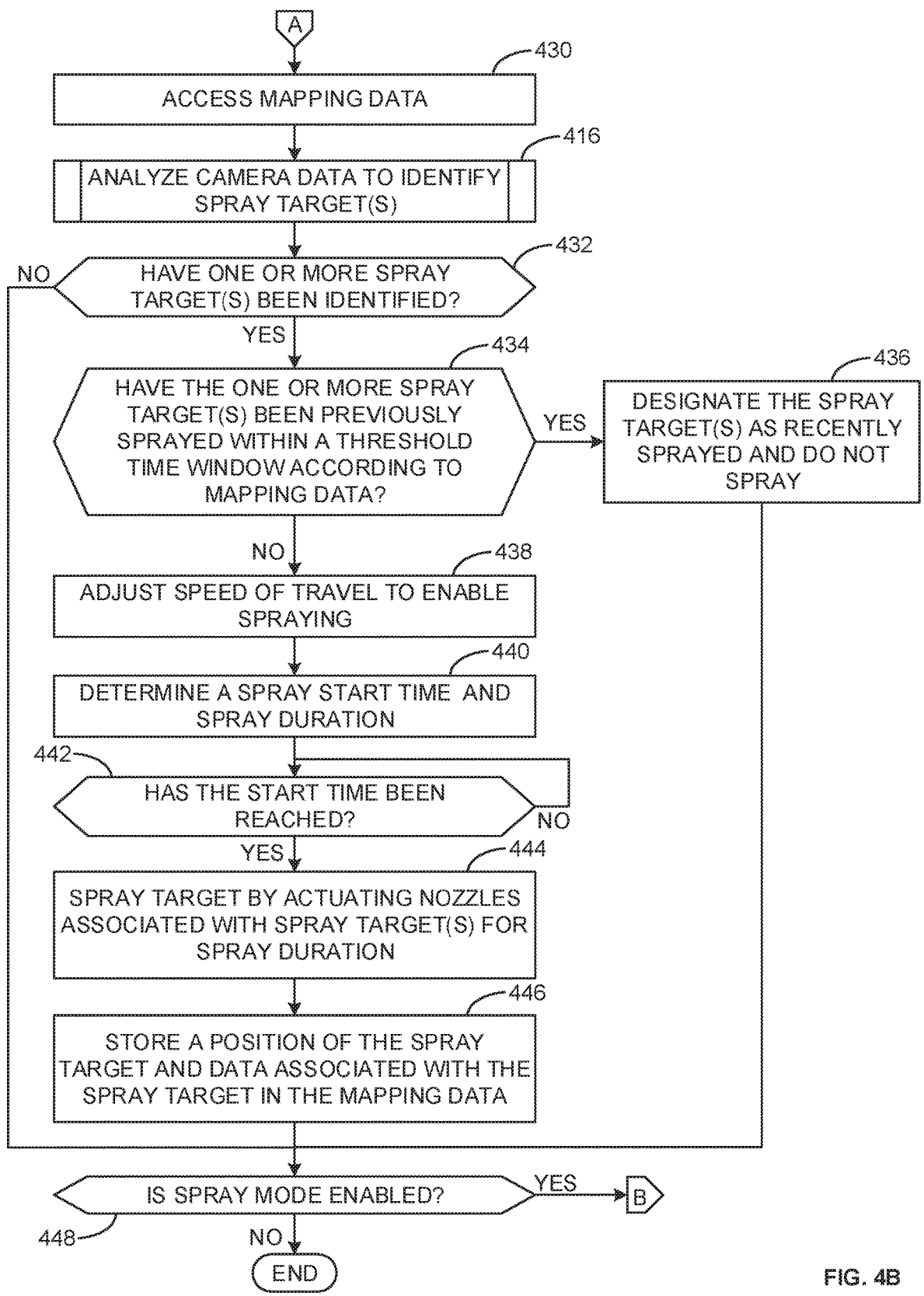

Example machine readable instructions 400 that may be executed by the electronic control module 202 to efficiently spray lawns are illustrated in FIGS. 4A-4B. With reference to the preceding figures and associated descriptions, the example machine readable instructions 400 of FIG. 4A begin with the electronic control module 202 determining whether spray mode is enabled (Block 402). In some examples, the control mode selector 318 determines whether spray mode is enabled. For example, an operator can select a spray mode setting on the operator controller 130 of the tractor 100 of FIGS. 1A-1B, resulting in the control mode selector 318 receiving control mode selection data indicating whether or not the spray mode is enabled. In response to the spray mode being enabled, processing transfers to blocks 404, 406, and 408. Conversely, in response to spray mode not being enabled, processing terminates.

At block 404, the example electronic control module 202 prepares spray solution. For example, the electronic control module 202 issues a series of commands to components of the tractor 100 to prepare spray solution. Detailed instructions to prepare spray solution are illustrated and described in connection with FIGS. 5A-5B.

At block 406, the example electronic control module 202 supplies spray solution to the boom of the tractor. For example, the electronic control module 202 issues a series of commands to components of the tractor 100 to supply spray solution to the boom 116. Detailed instructions to supply spray solution to the boom are illustrated and described in connection with FIGS. 5A-5B.

At block 408, the example electronic control module 202 accesses camera data. In some examples, the imager 322 accesses camera data (e.g., images, video, etc.). For example, the imager 322 can access camera data from the cameras 128 of the tractor 100.

At block 410, the example electronic control module 202 accesses speed data. In some examples, the speed determiner 310 accesses speed data. For example, the speed determiner 310 can receive speed data from the GPS receiver 122 on the tractor 100. The speed determiner 310 can receive speed data from any sensor and/or measurement device on the tractor 100, and/or can receive data that can be utilized to infer speed data (e.g., position data, acceleration data, etc.). In some examples, speed data may not be available, in which case execution of the instructions automatically proceeds to block 412.

At block 412, the example electronic control module 202 accesses position data. In some examples, the position data accessor 304 accesses position data. For example, the position data accessor 304 can access position data from the GPS receiver 122 on the tractor 100. In some examples, position data may not be available, in which case execution of the instructions automatically proceeds to block 414.

At block 414, the example electronic control module 202 determines whether mapping data is available. For example, the mapping data analyzer 312 can be queried to determine whether mapping data is available. In some examples, position data from the position data accessor 304 is utilized to query the mapping data analyzer 312 to identify whether mapping data exists for a specific location. In response to mapping data being available, processing transfers to block 430 of FIG. 4B. Conversely, in response to mapping data not being available, processing transfers to block 416.

At block 416, the example electronic control module 202 analyzes camera data to identify one or more spray target(s). In some examples, the spray target analyzer 320 analyzes camera data to identify one or more spray target(s). Detailed instructions to analyze camera data to identify one or more spray targets are illustrated and described in connection with FIG. 7.

At block 418, the example electronic control module 202 determines whether one or more spray target(s) have been identified. In some examples, the spray target determiner 326 determines whether one or more spray target(s) have been identified. In response to one or more spray target(s) being identified, processing transfers to block 420. Conversely, in response to no spray target being identified, processing transfers to block 408.

At block 420, the example electronic control module 202 adjusts the speed of travel of the tractor to enable spraying. In some examples, the speed selector 338 adjusts the speed of the tractor 100 to enable spraying. For example, if the spray target determiner 326 identifies a spray target approach the tractor 100, and, based on data from the speed determiner 310, there will be suboptimal spray conditions at the current speed, the speed selector 338 adjusts the speed of travel to slow down the tractor 100. In some examples, the speed selector 338 adjusts a speed to be at a specific value, below a threshold, and/or in a range in response to the control mode selector 318 indicating that an auto-spray mode is enabled.

At block 422, the example electronic control module 202 determines a spray start time and duration. In some examples, the spray configurator 316 determines a spray start time and duration. For example, the spray configurator 316 can determine how long it will be until a spray target is positioned under one of the nozzles 118 of the tractor 100 based on information from the spray target determiner 326 and the speed determiner 310, and thereby determine a start time for the spray operation. Similarly, the spray configurator 316 can determine a spray duration based on the size of the spray target using data from the spray target determiner 326, and based on the speed of the tractor 100 from the speed determiner 310. In some examples, the mapping data analyzer 312 can provide information to the spray configurator to help determine a size and/or position of the spray target to enhance the ability of the spray configurator 316 to accurately determine a start time and a duration.

At block 424, the example electronic control module 202 determines whether the start time has been reached. In some examples, the timer 342 can be used to determine whether the start time has been reached. For example, the spray configurator 316 can compare the start time with a current time tracked by the timer 342 to determine whether the start time has been reached. In response to the start time being reached, processing transfers to block 424. Conversely, in response to the start time not being reached, processing remains at block 424.

At block 426, the example electronic control module 202 sprays target(s) by actuating nozzles associated with spray targets for the spray duration. In some examples, the nozzle controller 336 actuates the nozzles 118 of the tractor 100 to spray target(s) for the spray duration. In some examples, the valve controller 334 actuates the fourth valve 212 to supply the boom 116 with lawn treatment mixture from the first mix tank 106 or the second mix tank 108, depending on fluid level data accessed by the fluid level analyzer 306. In some examples, the spray configurator 316 indicates to the nozzle controller 336 the ones of the nozzles 118 that should be actuated to spray the target(s). The valve controller 334 can maintain the position of the fourth valve 212, and the nozzle controller 336 can retain the position of the ones of the nozzles 118 that are actuated, throughout the entire spray duration.

At block 428, the example electronic control module 202 determines whether a spray mode is enabled. In some examples, the control mode selector 318 determines whether spray mode is enabled. In response to the spray mode being enabled, processing transfers to block 408. Conversely, in response to spray mode not being enabled, processing terminates.

The example machine readable instructions 400 continue in FIG. 4B. With reference to the preceding figures and associated descriptions, the example machine readable instructions 400 continue with the example electronic control module 202 accessing mapping data (Block 430). In some examples, the mapping data analyzer 312 accesses mapping data. In some examples, the position data accessed by the position data accessor 304 is used to query the mapping data analyzer 312 to obtain relevant mapping data for a current position of the tractor 100.

At block 432, the example electronic control module 202 determines whether one or more spray target(s) have been identified. In some examples, the spray target determiner 326 determines whether one or more spray target(s) have been identified. In response to one or more spray target(s) being identified, processing transfers to block 434. Conversely, in response to no spray target being identified, processing transfers to block 448.

At block 434, the example electronic control module 202 determines whether one or more spray target(s) have been previously sprayed within a threshold time window according to mapping data. In some examples, the mapping data analyzer 312 determines whether one or more spray target(s) have been previously sprayed within a threshold time window by comparing one or more characteristics (e.g., a color, shape, etc.) of a spray target from the spray target determiner 326 and/or position data (e.g., from the GPS receiver 122 of the tractor 100) with mapping data pertaining to previously spray target(s). In some examples, the mapping data analyzer 312 can compare a time from the timer 342 with a previous spray time to determine whether a target was sprayed within a threshold time window (e.g., within the last five days, within the last week, etc.). In response to the one or more spray target(s) having been previously sprayed within the threshold time window, processing transfers to block 436. Conversely, in response to the one or more spray target(s) not having been sprayed within the threshold time window, processing transfers to block 438.

At block 436, the example electronic control module 202 designates the spray target(s) as recently sprayed and does not spray the spray target(s). In some examples, the map generator 308 and/or the mapping data analyzer 312 designate the spray target(s) as recently sprayed and provide an indication to the spray configurator 316 to not initiate spraying of the spray target(s).

At block 438, the example electronic control module 202 adjusts the speed of travel of the tractor to enable spraying. In some examples, the speed selector 338 adjusts the speed of the tractor 100 to enable spraying. In some examples, the speed selector 338 adjusts a speed to be at a specific value, below a threshold, and/or in a range in response to the control mode selector 318 indicating that an auto-spray mode is enabled.

At block 440, the example electronic control module 202 determines a spray start time and duration. In some examples, the spray configurator 316 determines a spray start time and duration. For example, the spray configurator 316 can determine how long it will be until a spray target is positioned under one of the nozzles 118 of the tractor 100 based on information from the spray target determiner 326 and the speed determiner 310, and thereby determine a start time for the spray operation. Similarly, the spray configurator 316 can determine a spray duration based on the size of the spray target using data from the spray target determiner 326, and based on the speed of the tractor 100 from the speed determiner 310.

At block 442, the example electronic control module 202 determines whether the start time has been reached. In some examples, the timer 342 can be used to determine whether the start time has been reached. The spray configurator 316 can compare the start time with a current time tracked by the timer 342 to determine whether the start time has been reached. In response to the start time being reached, processing transfers to block 444. Conversely, in response to the start time not being reached, processing remains at block 442.

At block 444, the example electronic control module 202 sprays target(s) by actuating nozzles associated with spray targets for the spray duration. In some examples, the nozzle controller 336 actuates the nozzles 118 of the tractor 100 to spray target(s) for the spray duration. In some examples, the valve controller 334 actuates the fourth valve 212 to supply the boom 116 with lawn treatment mixture from the first mix tank 106 or the second mix tank 108, depending on fluid level data accessed by the fluid level analyzer 306. In some examples, the spray configurator 316 indicates to the nozzle controller 336 the ones of the nozzles 118 that should be actuated to spray the target(s). The valve controller 334 can maintain the position of the fourth valve 212, and the nozzle controller 336 can retain the position of the ones of the nozzles 118 that are actuated, throughout the spray duration.

At block 446, the example electronic control module 202 stores a position of the spray target in the mapping data. In some examples, the map generator 308 stores a position of the spray target in the mapping data. In some examples, the map generator 308 stores characteristics of the spray target (e.g., a size of the spray target, a color of the spray target, a texture of the spray target, etc.) and/or a time associated with the spray operation performed on the spray target, in addition to storing the position data from the GPS receiver 122.

At block 448, the example electronic control module 202 determines whether a spray mode is enabled. In some examples, the control mode selector 318 determines whether spray mode is enabled. In response to the spray mode being enabled, processing transfers to block 408 of FIG. 4A. Conversely, in response to spray mode not being enabled, processing terminates.

Figure 5A:
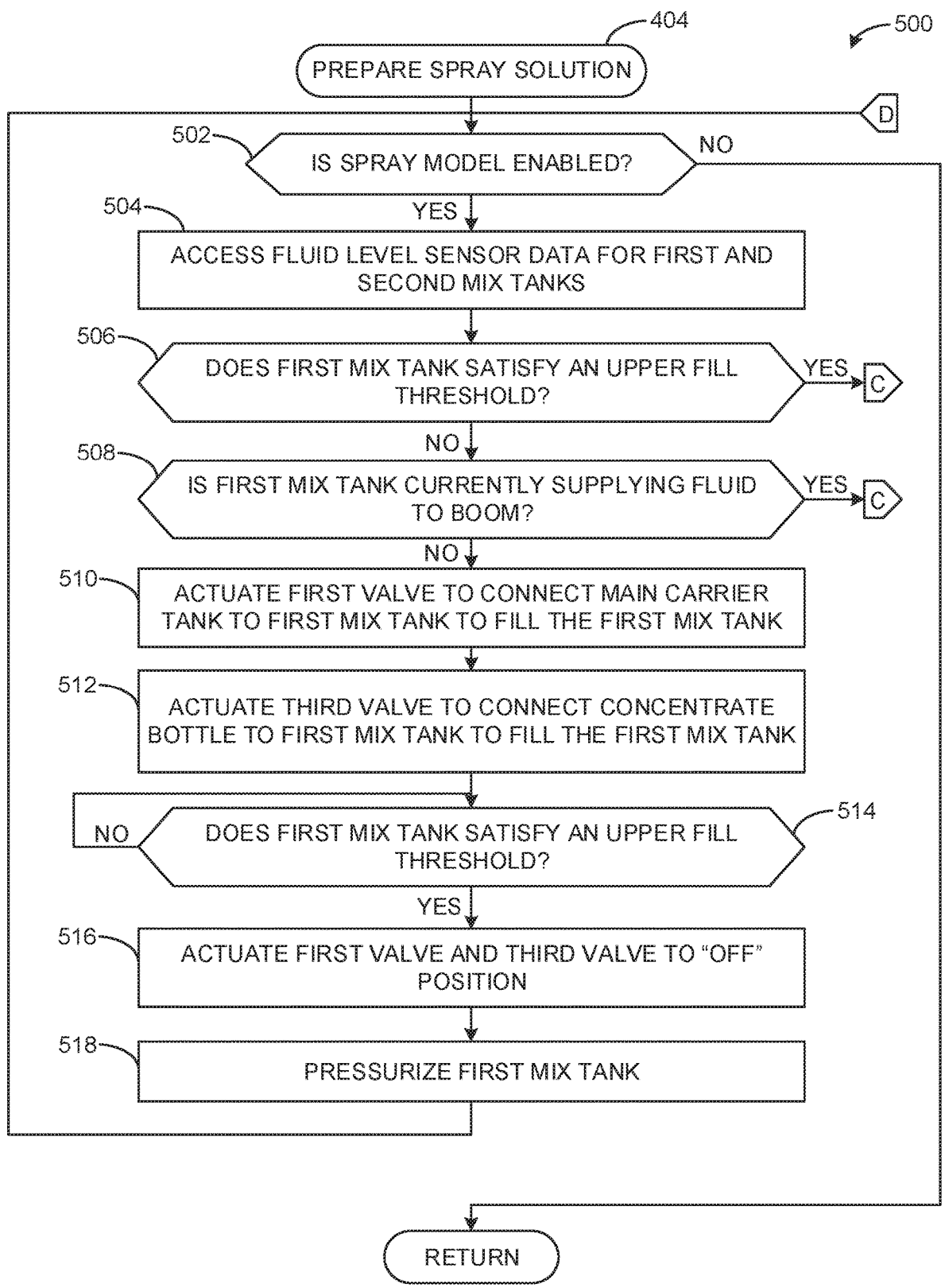
FIGS. 5A-5B form a flowchart representative of example machine readable instructions which may be executed to implement the spraying system to prepare a spray solution.
Figure 5B:
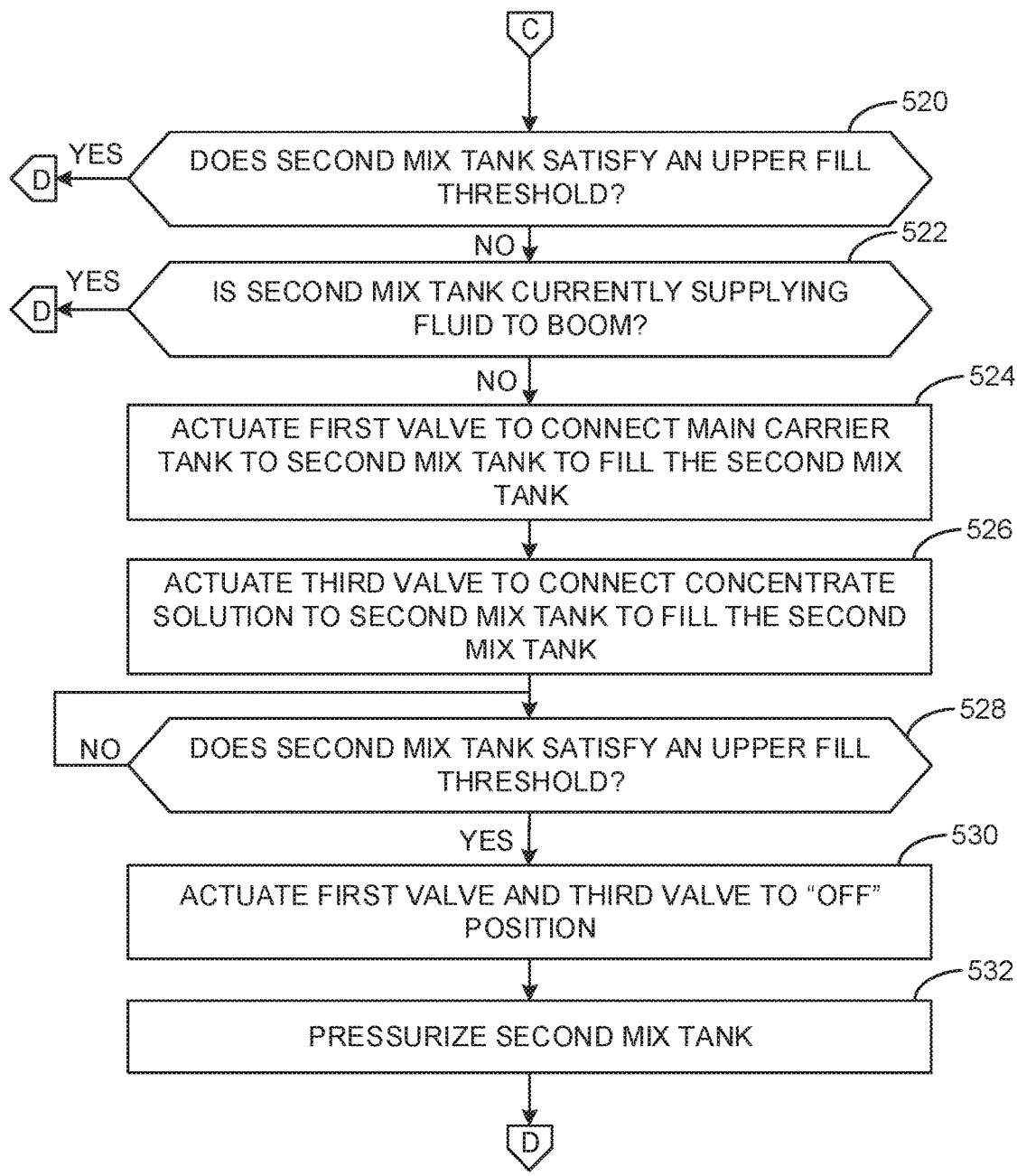

Example machine readable instructions 500 that may be executed by the electronic control module 202 to prepare spray solution are illustrated in FIGS. 5A-5B. With reference to the preceding figures and associated descriptions, the example machine readable instructions 500 of FIG. 5A begin with the electronic control module 202 determining whether a spray mode is enabled (Block 502). In some examples, the control mode selector 318 determines whether spray mode is enabled. In response to the spray mode being enabled, processing transfers to block 408 of FIG. 4A. Conversely, in response to spray mode not being enabled, processing returns to the machine readable instructions 400 of FIG. 4A.

At block 504, the example electronic control module 202 accesses fluid level sensor data for first and second mix tanks. In some examples, the fluid level analyzer 306 accesses fluid level sensor data from the first fluid level sensor 218 associated with the first mix tank 106 and the second fluid level sensor 220 associated with the second mix tank 108.

At block 506, the example electronic control module 202 determines whether the first mix tank satisfies an upper fill threshold. In some examples, the fluid level analyzer 306 compares fluid level data from the first fluid level sensor 218 to the upper fill threshold to determine whether the fluid level of the first mix tank 106 satisfies the upper fill threshold. In some examples, the upper fill threshold is set to a level at which a mix tank is considered full and ready to be dispensed. In response to the first mix tank satisfying the upper fill threshold, processing transfers to block 520 of FIG. 5B. Conversely, in response to the first mix tank not satisfying the upper fill threshold, processing transfers to block 508.

At block 508, the example electronic control module 202 determines whether the first mix tank is currently supplying fluid to the boom. In some examples, the status monitor 330 determines whether the first mix tank 106 is currently providing fluid (e.g., lawn treatment mixture) to the boom 116 by analyzing a position of the fourth valve 212. If the fourth valve 212 is actuated such that the first mix tank 106 is connected to the boom 116, the first mix tank 106 supplies fluid to the boom 116. In response to the first mix tank supplying fluid to the boom, processing transfers to block 520 of FIG. 5B. Conversely, in response to the first mix tank not supplying fluid to the boom, processing transfers to block 510.

At block 510, the example electronic control module 202 actuates the first valve to connect the main carrier tank to the first mix tank to fill the first mix tank. In some examples, the valve controller 334 actuates the first valve 204 to connect the main carrier tank 104 to the first mix tank 106 to fill the first mix tank 106.

At block 512, the example electronic control module 202 actuates the third valve to connect the concentrate bottle to the first mix tank to fill the first mix tank. In some examples, the valve controller 334 actuates the third valve 210 to connect the concentrate bottle 110 to the first mix tank 106 to fill the first mix tank 106. When the concentrate substance from the concentrate bottle 110 is mixed with the main carrier substance from the main carrier tank 104, a lawn treatment mixture is formed.

At block 514, the example electronic control module 202 determines whether the first mix tank satisfies an upper fill threshold. In some examples, the fluid level analyzer 306 analyzes fluid level data from the first fluid level sensor 218 to determine whether the first mix tank 106 satisfies an upper fill threshold. In response to the first mix tank 106 satisfying the upper fill threshold, processing transfers to block 516. Conversely, in response to the first mix tank 106 not satisfying the upper fill threshold, processing remains at block 514.

At block 516, the example electronic control module 202 actuates the first valve and the third valve to the "OFF" position. In some examples, the valve controller 334 actuates the first valve 204 to the "OFF" position and actuates the third valve 210 to the "OFF" position, thereby ending filling of the first mix tank 106.

At block 518, the example electronic control module 202 pressurizes the first mix tank. In some examples, the pump controller 332 actuates the pneumatic pump 214 to an "ON" state, and the valve controller 334 connects the pneumatic pump 214 to the first mix tank 106 by actuating the fifth valve 216. The example electronic control module 202 may include a pressure sensor to determine when the first mix tank 106 is sufficiently pressurized and then indicate to the pump controller 332 to turn the pneumatic pump 214 to an "OFF" state, and indicate to the valve controller 334 to actuate the fifth valve 216 to an "OFF" state. In some examples, the pneumatic pump 214 is configured to be "ON" for a specified time (e.g., five seconds, ten seconds, etc.) to pressurize the first mix tank 106, and turn off after this time period. The timer 342 can be used to track the amount of time a pressurization process has been running. In response to the pneumatic pump 214 being switched to an "OFF" state by the pump controller 332, the valve controller 334 can actuate the fifth valve 216 to the "OFF" state.

The example machine readable instructions 500 continue in FIG. 5B. With reference to the preceding figures and associated descriptions, the example machine readable instructions 500 continue with the example electronic control module 202 determining whether the second mix tank satisfies an upper fill threshold (Block 520). In some examples, the fluid level analyzer 306 compares fluid level data from the second fluid level sensor 220 to the upper fill threshold to determine whether the fluid level of the second mix tank 108 satisfies the threshold. In some examples, the upper fill threshold is set to a level at which a mix tank is considered full and ready to be dispensed. In response to the second mix tank satisfying the upper fill threshold, processing transfers to block 502 of FIG. 5A. Conversely, in response to the second mix tank not satisfying the upper fill threshold, processing transfers to block 522.

At block 522, the example electronic control module 202 determines whether the second mix tank is currently supplying fluid to the boom. In some examples, the status monitor 330 determines whether the second mix tank 108 is currently providing fluid (e.g., lawn treatment mixture) to the boom 116 by analyzing a position of the fourth valve 212. If the fourth valve 212 is actuated such that the second mix tank 108 is connected to the boom 116, the second mix tank 108 supplies fluid to the boom 116. In response to the second mix tank supplying fluid to the boom, processing transfers to block 502 of FIG. 5A. Conversely, in response to the second mix tank not supplying fluid to the boom, processing transfers to block 524.

At block 524, the example electronic control module 202 actuates the first valve to connect the main carrier tank to the second mix tank to fill the second mix tank. In some examples, the valve controller 334 actuates the first valve 204 to connect the main carrier tank 104 to the second mix tank 108 to fill the second mix tank 108.

At block 526, the example electronic control module 202 actuates the third valve to connect the concentrate bottle to the second mix tank to fill the second mix tank. In some examples, the valve controller 334 actuates the third valve 210 to connect the concentrate bottle 110 to the second mix tank 108 to fill the second mix tank 108. When the concentrate substance from the concentrate bottle 110 is mixed with the main carrier substance from the main carrier tank 104, a lawn treatment mixture is formed.

At block 528, the example electronic control module 202 determines whether the second mix tank satisfies an upper fill threshold. In some examples, the fluid level analyzer 306 analyzes fluid level data from the second fluid level sensor 220 to determine whether the second mix tank 108 satisfies an upper fill threshold. In response to the second mix tank 108 satisfying the upper fill threshold, processing transfers to block 530. Conversely, in response to the second mix tank 108 not satisfying the upper fill threshold, processing remains at block 528.

At block 530, the example electronic control module 202 actuates the first valve and the third valve to the "OFF" position. In some examples, the valve controller 334 actuates the first valve 204 to the "OFF" position and actuates the third valve 210 to the "OFF" position, thereby ending filling of the second mix tank 108.

At block 532, the example electronic control module 202 pressurizes the second mix tank. In some examples, the pump controller 332 actuates the pneumatic pump 214 to an "ON" state, and the valve controller 334 connects the pneumatic pump 214 to the second mix tank 108 by actuating the fifth valve 216. The example electronic control module 202 may include a pressure sensor to determine when the second mix tank 108 is sufficiently pressurized and then indicate to the pump controller 332 to turn the pneumatic pump 214 to an "OFF" state, and indicate to the valve controller 334 to actuate the fifth valve 216 to an "OFF" state. In some examples, the pneumatic pump 214 is configured to be "ON" for a specified time (e.g., five seconds, ten seconds, etc.) to pressurize the second mix tank 108, and turn off after this time period. The timer 342 can be used to track the amount of time a pressurization process has been running. In response to the pneumatic pump 214 being switched to an "OFF" state by the pump controller 332, the valve controller 334 can actuate the fifth valve 216 to the "OFF" state.

Figure 6:
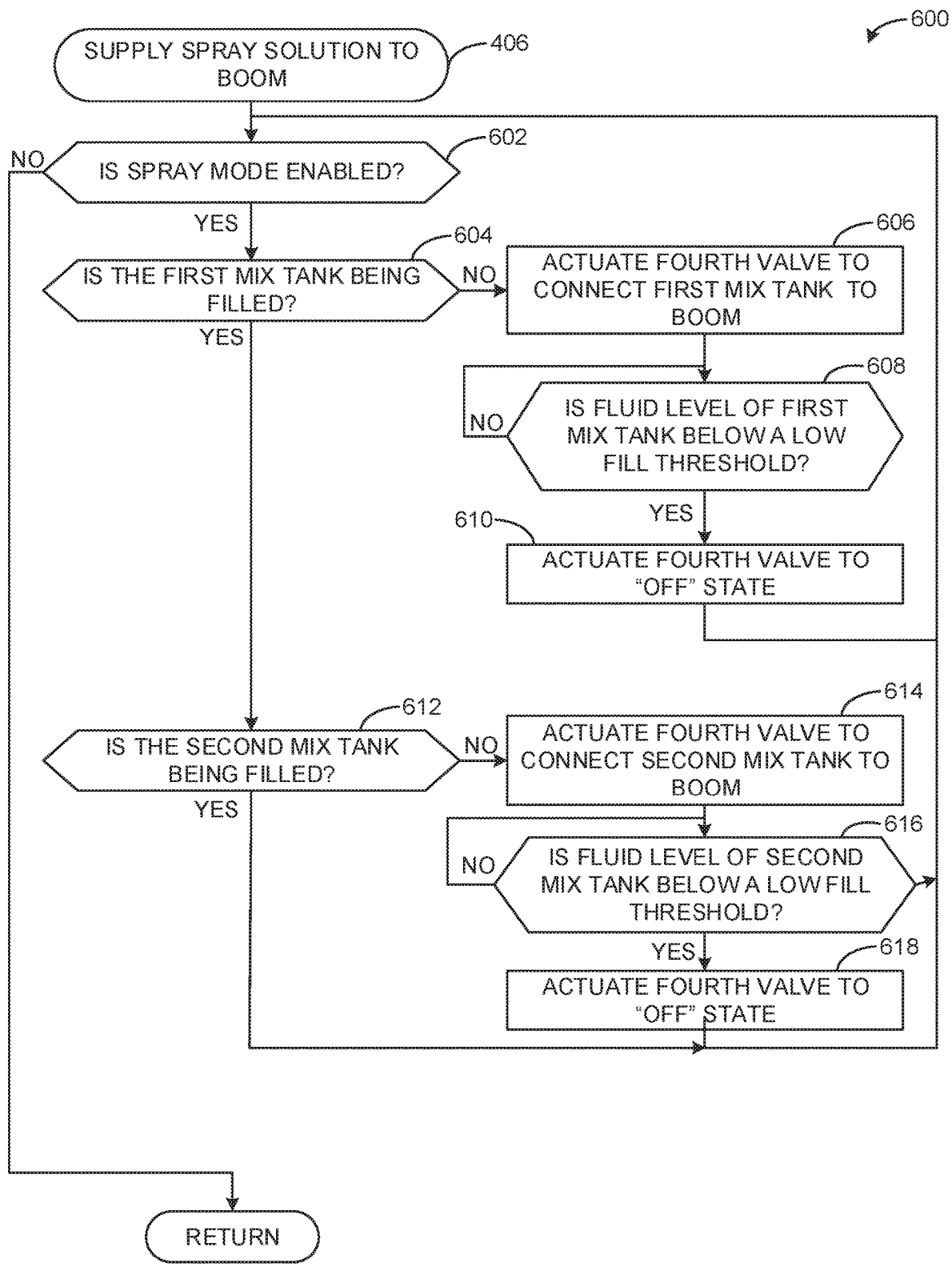
FIG. 6 is a flowchart representative of example machine readable instructions which may be executed to implement the spraying system to supply a spray solution to a boom.

Example machine readable instructions 600 that may be executed by the electronic control module 202 to supply spray solution to the boom are illustrated in FIG. 6. With reference to the preceding figures and associated descriptions, the example machine readable instructions 600 of FIG. 6 begin with the electronic control module 202 determining whether spray mode is enabled (Block 602). In some examples, the control mode selector 318 determines whether spray mode is enabled. In response to the spray mode being enabled, processing transfers to block 604. Conversely, in response to spray mode not being enabled, processing terminates.

At block 604, the example electronic control module 202 determines whether the first mix tank is being filled. In some examples, the status monitor 330 determines whether the first valve 204 is actuated to connect the main carrier tank 104 to the first mix tank 106, and/or whether the third valve 210 is actuated to connect the concentrate bottle 110 to the first mix tank 106. In response to the first mix tank being filled, processing transfers to block 612. Conversely, in response to the first mix tank not being filled, processing transfers to block 606.

At block 606, the example electronic control module 202 actuates the fourth valve to connect the first mix tank to the boom. In some examples, the valve controller 334 actuates the fourth valve 212 to connect the first mix tank 106 to the boom 116.

At block 608, the example electronic control module 202 determines whether the fluid level of the first mix tank is below a low fill threshold. In some examples, the fluid level analyzer 306 determines whether the fluid level of the first mix tank 106 is below a low fill threshold. For example, the low fill threshold can be the minimum amount of fluid required to continue using a mix tank to supply the boom 116 with lawn treatment mixture. In response to the fluid level of the first mix tank being below the low fill threshold, processing transfers to block 610. Conversely, in response to the fluid level of the first mix tank not being below the low fill threshold, processing remains at block 608.

At block 610, the example electronic control module 202 actuates the fourth valve to the "OFF" state. In some examples, the valve controller 334 actuates the fourth valve 212 to the "OFF" state, thereby ending connection of the first mix tank 106 and the boom 116.

At block 612, the example electronic control module 202 determines whether the second mix tank is being filled. In some examples, the status monitor 330 determines whether the first valve 204 is actuated to connect the main carrier tank 104 to the second mix tank 108, and/or whether the third valve 210 is actuated to connect the concentrate bottle 110 to the second mix tank 108. In response to the second mix tank being filled, processing transfers to block 602. Conversely, in response to the second mix tank not being filled, processing transfers to block 614.

At block 614, the example electronic control module 202 actuates the fourth valve to connect the second mix tank to the boom. In some examples, the valve controller 334 actuates the fourth valve 212 to connect the second mix tank 108 to the boom 116.

At block 616, the example electronic control module 202 determines whether the fluid level of the second mix tank is below a low fill threshold. In some examples, the fluid level analyzer 306 determines whether the fluid level of the second mix tank 108 is below a low fill threshold. In response to the fluid level of the second mix tank being below the low fill threshold, processing transfers to block 618. Conversely, in response to the fluid level of the second mix tank not being below the low fill threshold, processing remains at block 616.

At block 618, the example electronic control module 202 actuates the fourth valve to the "OFF" state. In some examples, the valve controller 334 actuates the fourth valve 212 to the "OFF" state, thereby ending connection of the second mix tank 108 and the boom 116.

Figure 7:
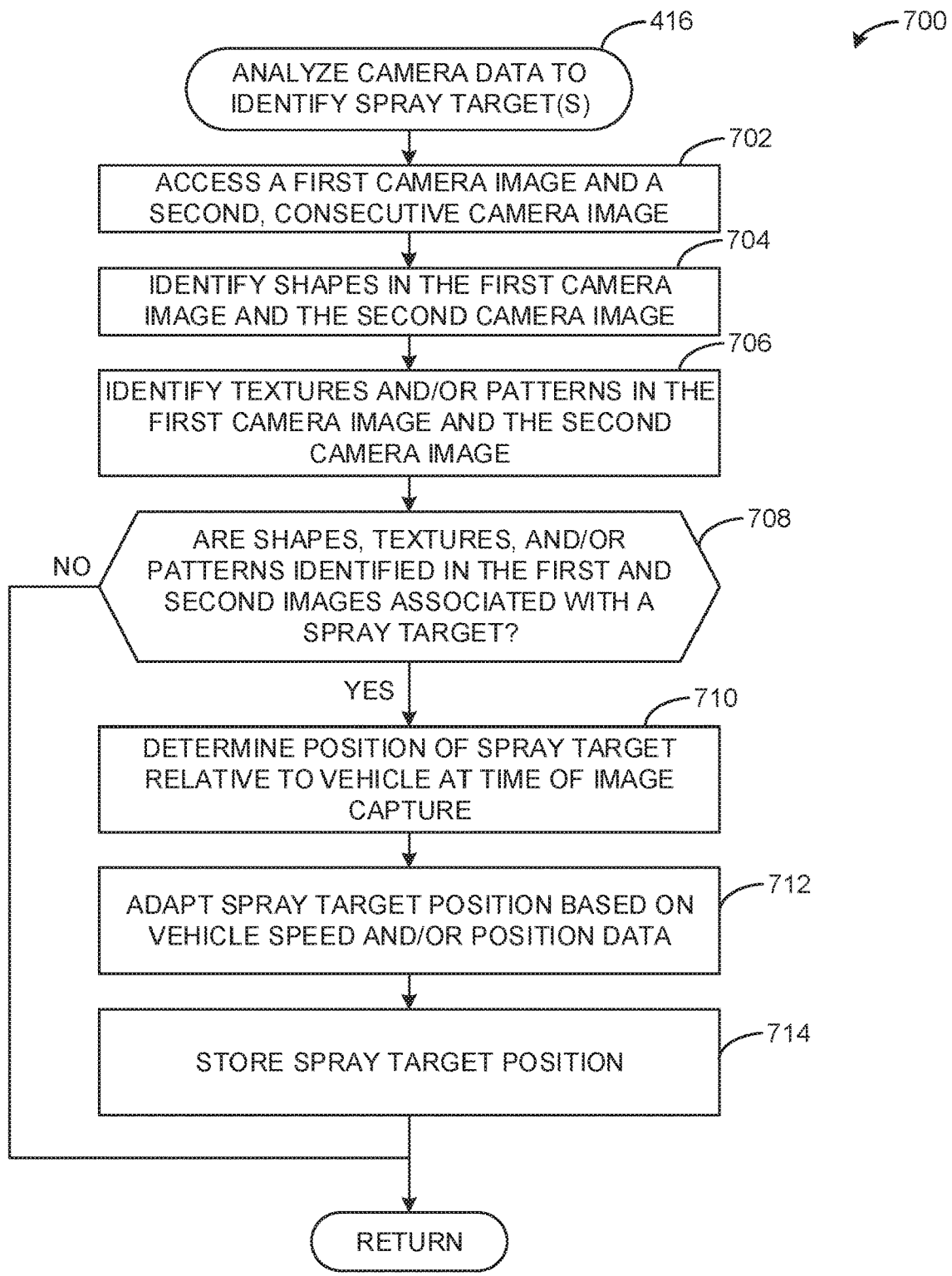
FIG. 7 is a flowchart representative of example machine readable instructions to implement the spraying system to analyze camera data to identify spray target(s).

Example machine readable instructions 700 that may be executed by the electronic control module 202 to analyze camera data to identify spray target(s) are illustrated in FIG. 7. With reference to the preceding figures and associated descriptions, the example machine readable instructions 700 of FIG. 7 begin with the electronic control module 202 accessing a first camera image and a second, consecutive camera image (Block 702). In some examples, the imager 322 accesses the first camera image and the second, consecutive camera image from the cameras 128. In some examples, the imager 322 accesses images as they are captured by the cameras 128.

At block 704, the example electronic control module 202 identifies shapes in the first camera image and the second camera image. For example, the image analyzer 324 analyzes the first camera image and the second camera image to identify shapes in the images. In some examples, in response to identifying a shape in the first camera image or in the second camera image, the image analyzer 324 attempts to search for the same (or similar) shape in the other camera image, to verify the existence of the shape, to ascertain how quickly the shape is approaching, and/or to gain more information pertaining to the shape. In some examples, the image analyzer 324 can utilize a machine learning model to identify shapes in the first and second camera images.

At block 706, the example electronic control module 202 identifies textures and/or patterns in the first camera image and the second camera image. In some examples, the image analyzer 324 analyzes the first camera image and the second camera image to identify textures and/or patterns in the images. In some examples, the image analyzer 324 can utilize a machine learning model to identify textures and/or patterns in the first and second camera images.

At block 708, the example electronic control module 202 determines if shapes, textures, and/or patterns identified in the first and second images are associated with a spray target. In some examples, the spray target determiner 326 determines if shapes, textures, and/or patterns identified in the first and second images are associated with a spray target. For example, the spray target determiner 326 can compare identified shapes, textures, and/or patterns to known shapes, textures, and/or patterns associated with spray targets (e.g., weeds). The spray target determiner 326 can also use other identified characteristics, such as color, to identify spray targets. In some examples, the spray target determiner 326 can utilize a machine learning model to compare identified shapes, textures, and/or patterns with known shapes, textures, and/or patterns associated with spray targets. In response to the shapes, textures, and/or patterns being associated with a spray target, processing transfers to block 710. Conversely, in response to the shapes, textures, and/or patterns not being associated with a spray target, processing returns to block 418 of FIG. 4A or block 432 of FIG. 4B.

At block 710, the example electronic control module 202 determines a position of the spray target relative to vehicle at the time of image capture. For example, the spray target determiner 326 can determine a position of the spray target relative to the tractor 100. In some examples, the spray target determiner 326 determines a distance from the spray target to the nozzles 118.

At block 712, the example electronic control module 202 adapts the spray target position based on vehicle speed and/or comparing position data. In some examples, the spray target determiner 326 adapts the previously determined position based on position data accessed by the position data accessor 304 or speed data accessed by the speed determiner 310. In some examples, the spray target determiner 326 determines an amount of time since the image was captured by comparing a timestamp associated with the image with a current time from the timer 342. Thereafter, the spray target determiner 326 determines position data relative to the time the image was captured to adapt the spray target position based on the movement of the tractor 100 since the image was captured. For example, if the image is captured at a first position, and the spray target determiner 326 does not identify the spray target for two-tenths of a second, the spray target determiner 326 can determine how far the tractor 100 traveled in those two-tenths of a second based on position data or speed data, and update the position of the spray target to be relative to the new position of the tractor 100.

At block 714, the example electronic control module 202 stores the spray target position. In some examples, the spray target determiner 326 stores the spray target position to the data store 344. In some examples, the spray target determiner 326 additionally or alternatively communicates the spray target position to the spray configurator 316, and/or to the map generator 308 to be added to mapping data.

Figure 8A:
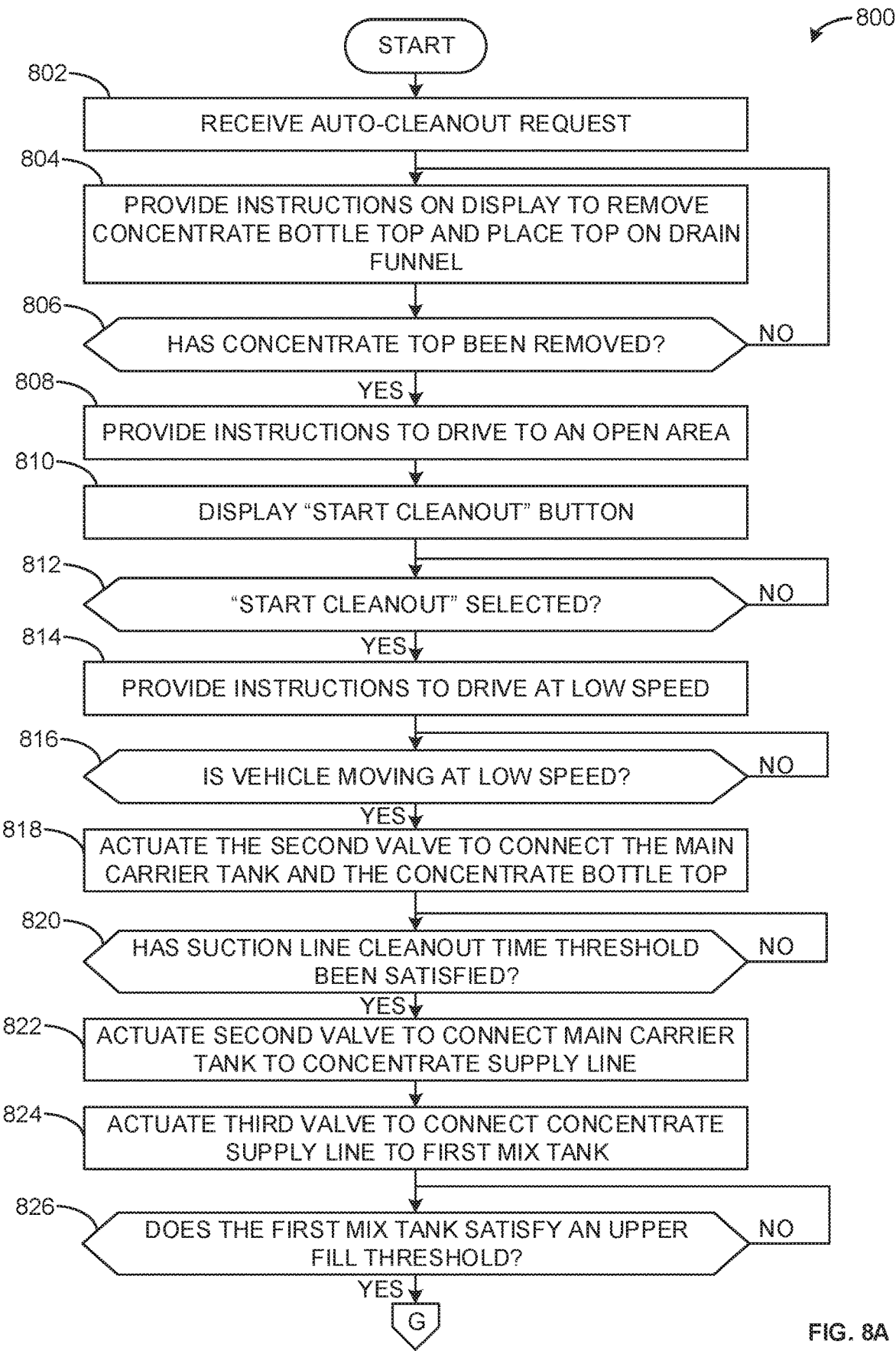
FIGS. 8A-8B form a flowchart representative of example machine readable instructions which may be executed to implement the spraying system to perform an auto-cleanout operation.
Figure 8B:
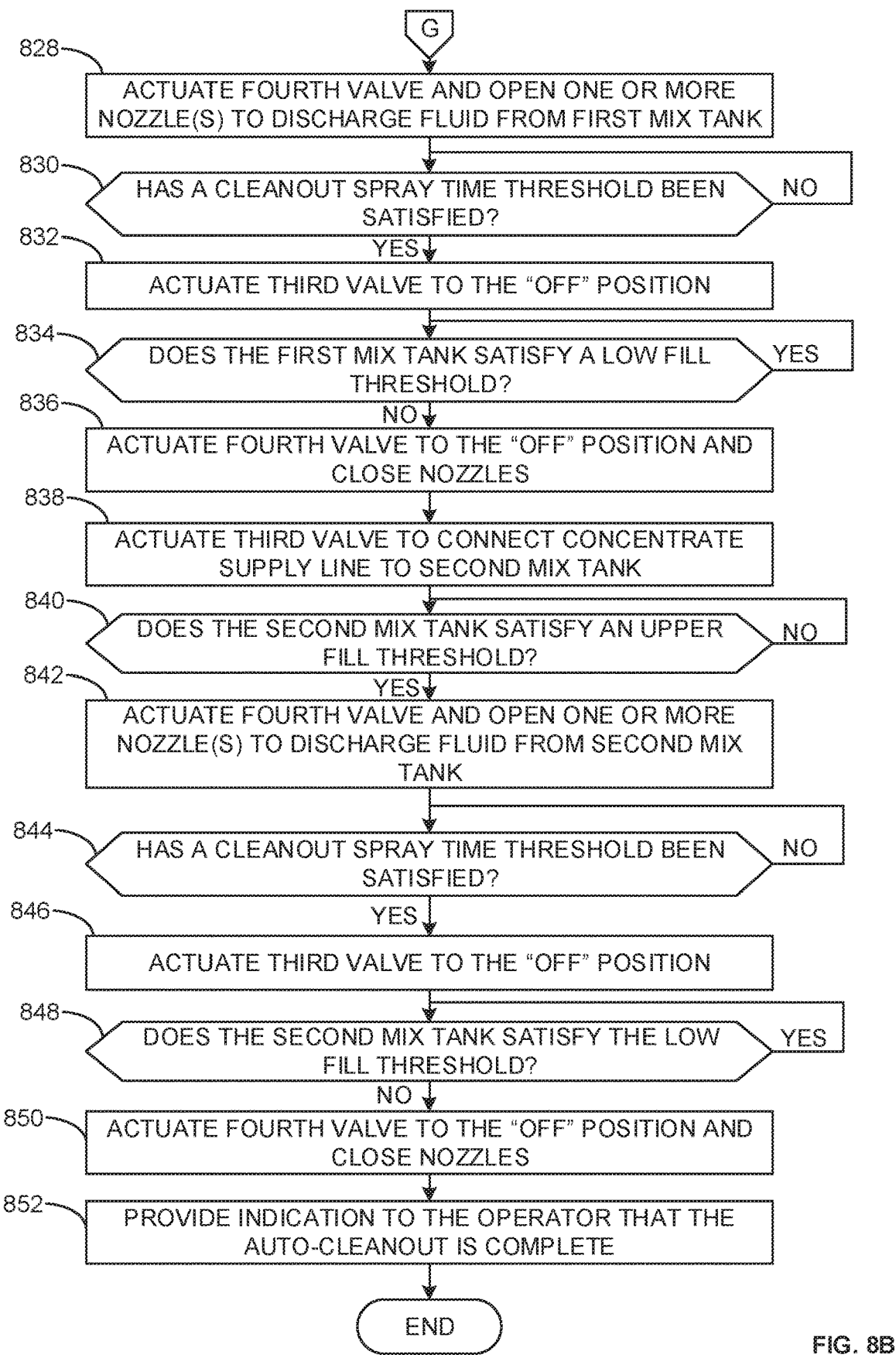

Example machine readable instructions 800 that may be executed by the electronic control module 202 to perform an auto-cleanout operation are illustrated in FIGS. 8A-8B. With reference to the preceding figures and associated descriptions, the example machine readable instructions 800 of FIG. 8 begin with the example electronic control module 202 receiving an auto-cleanout request (Block 802). In some examples, the control mode selector 318 accesses an auto-cleanout request from control mode selection data associated with the operator controller 130.

At block 804, the example electronic control module 202 provides instructions on a display to remove the top of the concentrate bottle and place the top on the drain funnel. In some examples, the display controller 340 provides instructions on the display associated with the operator controller 130 for an operator to remove the concentrate bottle top 112 and place it on top of a drain funnel.

At block 806, the example electronic control module 202 determines whether the concentrate bottle top has been removed. In some examples, the concentrate top monitor 314 accesses concentrate top sensor data to determine whether the concentrate bottle top 112 has been removed from the concentrate bottle 110. In response to the concentrate bottle top having been removed from the concentrate bottle, processing transfers to block 808. Conversely, in response to the concentrate bottle top not having been removed from the concentrate bottle, processing transfers to block 804.

At block 808, the example electronic control module 202 provides instructions to drive to an open area. For example, the display controller 340 can display instructions on a display of the operator controller 130 instructing the operator to drive the tractor 100 to an open area.

At block 810, the example electronic control module 202 displays a "start cleanout" button. In some examples, the display controller 340 displays a "start cleanout" button on a display of the operator controller 130. The "start cleanout" button can be any sort of actuatable button, lever, trigger, etc. to initiate the auto-cleanout procedure, once the tractor 100 is in an open area. In some examples, the display controller 340 can be configured to only display the "start cleanout" button when the position data accessed by the position data accessor 304 indicates that the tractor 100 is in a position acceptable for an auto-cleanout procedure (e.g., an area designated for clean-out).

At block 812, the example electronic control module 202 determines whether "start cleanout" has been selected. In some examples, the control mode selector 318 and/or the status monitor 330 accesses an indication from the operator controller 130 of whether "start cleanout" has been selected. In response to "start cleanout" being selected, processing transfers to block 814. Conversely, in response to "start cleanout" not being selected, processing remains at block 812.

At block 814, the example electronic control module 202 provides instructions to dive at low speeds. In some examples, the display controller 340 provides instructions via the operator controller 130 instructing the tractor 100 to be operated at a low speed, to ensure that the discharge from the auto-cleanout operation is dispersed.

At block 816, the example electronic control module 202 determines whether the vehicle is moving at low speed. In some examples, the speed determiner 310 accesses speed data (e.g., from the GPS receiver 122, from a speed sensor, etc.) to determine whether the tractor 100 is moving at low speeds. In some examples, the speed determiner 310 compares a speed value from the GPS receiver 122 to a threshold to determine if the tractor 100 is operating at low speed. In response to the tractor 100 moving at low speed, processing transfers to block 818. Conversely, in response to the vehicle not moving at low speed, processing remains at block 816.

At block 818, the example electronic control module 202 actuates the second valve to connect the main carrier tank and the concentrate bottle top. In some examples, the valve controller 334 actuates the second valve 206 to connect the main carrier tank 104 and the concentrate bottle top 112.

At block 820, the example electronic control module 202 determines whether a suction line cleanout time threshold has been satisfied. In some examples, the status monitor 330 compares time values from the timer 342 to determine whether a suction line cleanout time has been satisfied. The suction line cleanout time can be a time that is necessary to sufficiently clean out the suction line (e.g., the line connected to the concentrate bottle top 112) to remove any remaining concentrate substance. In response to the suction line cleanout time threshold being satisfied, processing transfers to block 822. Conversely, in response to the suction line cleanout time threshold not being satisfied, processing remains at block 820.

At block 822, the example electronic control module 202 actuates the second valve to connect the main carrier tank to the concentrate supply line. In some examples, the valve controller 334 actuates the second valve 206 to connect the main carrier tank 104 to the concentrate supply line (e.g., corresponding to the line connected to the direct injection pump 208).

At block 824, the example electronic control module 202 actuates the third valve to connect the concentrate supply line to the first mix tank. In some examples, the valve controller 334 actuates the third valve 210 to connect the concentrate supply line to the first mix tank 106.

At block 826, the example electronic control module 202 determines whether the first mix tank satisfies an upper fill threshold. In some examples, the fluid level analyzer 306 determines whether the first mix tank 106 is full based on fluid level data from the first fluid level sensor 218. In some examples, the fluid level analyzer 306 compares fluid level data from the first fluid level sensor 218 to an upper fill threshold.

The example machine readable instructions 800 continue in FIG. 8B. With reference to the preceding figures and associated descriptions, the example machine readable instructions 800 continue with the example electronic control module 202 actuating the fourth valve and opening one or more nozzle(s) to discharge fluid from the first mix tank (Block 828). In some examples, the valve controller 334 actuates the fourth valve 212 and opens one or more of the nozzles 118 to discharge fluid from the first mix tank 106.

At block 830, the example electronic control module 202 determines whether a cleanout spray time threshold has been satisfied. In some examples, the status monitor 330 and/or the valve controller 334 compare time values tracked by the timer 342 to determine whether the cleanout spray time threshold has been satisfied. In response to the cleanout spray time threshold having been satisfied, processing transfers to block 832. Conversely, in response to the cleanout spray time threshold not having been satisfied, processing remains at block 830.

At block 832, the example electronic control module 202 actuates the third valve to the "OFF" position. In some examples, the valve controller 334 actuates the third valve 210 to the "OFF" position, thereby ending the connection between the concentrate supply line and the first mix tank 106.

At block 834, the example electronic control module 202 determines if the first mix tank satisfies a low fill threshold. For example, the fluid level analyzer 306 can determine if the first mix tank 106 is empty by comparing fluid level data from the first fluid level sensor 218 with a low fill threshold. For example, if the fluid level satisfies the low fill threshold, the fluid level is above the low fill threshold. In response to the first mix tank not satisfying the low fill threshold, processing transfers to block 836. Conversely, in response to the first mix tank satisfying the low fill threshold, processing remains at block 834.

At block 836, the example electronic control module 202 actuates the fourth valve to the "OFF" position and closes the nozzles. In some examples, the valve controller 334 actuates the fourth valve 212 to the "OFF" position, thereby ending the connection of the first mix tank 106 to the boom 116, and closes ones of the nozzles 118 that are open.

At block 838, the example electronic control module 202 actuates the third valve to connect the concentrate supply line to the second mix tank. In some examples, the valve controller 334 actuates the third valve 210 to connect the concentrate supply line to the second mix tank 108.

At block 840, the example electronic control module 202 determines whether the second mix tank satisfies an upper fill threshold. In some examples, the fluid level analyzer 306 determines whether the second mix tank 108 is full by comparing fluid level data from the second fluid level sensor 220 to an upper fill threshold. In response to the second mix tank satisfying the upper fill threshold, processing transfers to block 842. Conversely, in response to the second mix tank not satisfying the upper fill threshold, processing remains at block 840.

At block 842, the example electronic control module 202 actuates the fourth valve and opens one or more nozzle(s) to discharge fluid from the second mix tank. In some examples, the valve controller 334 actuates the fourth valve 212 and opens one or more of the nozzles 118 to discharge fluid from the second mix tank 108.

At block 844, the example electronic control module 202 determines whether a cleanout spray time threshold has been satisfied. In some examples, the status monitor 330 and/or the valve controller 334 compare time values tracked by the timer 342 to determine whether the cleanout spray time threshold has been satisfied. In response to the cleanout spray time threshold having been satisfied, processing transfers to block 846. Conversely, in response to the cleanout spray time threshold not having been satisfied, processing remains at block 844.

At block 846, the example electronic control module 202 actuates the third valve to the "off" position. In some examples, the valve controller 334 actuates the third valve 210 to the "off" position.

At block 848, the example electronic control module 202 determines whether the second mix tank satisfies the low fill threshold. For example, the fluid level analyzer 306 can determine if the second mix tank 108 is empty by comparing fluid level data from the first fluid level sensor 220 with a low fluid threshold. For example, if the fluid level does not satisfy the low fluid threshold, then the second mix tank 108 can be considered to be empty. In response to the first mix tank not satisfying the low fill threshold, processing transfers to block 850. Conversely, in response to the second mix tank satisfying the low fill threshold, processing remains at block 848.

At block 850, the example electronic control module 202 actuates the fourth valve to the "off" position. In some examples, the valve controller 334 actuates the fourth valve 212 to the "off" position, thereby ending the connection from the second mix tank 108 to the boom 116.

At block 852, the example electronic control module 202 provides an indication to the operator that the auto-cleanout is complete. For example, the display controller 340 can cause a display of the operator controller 130 to display an indication that the auto-cleanout process is complete.

Figure 9:
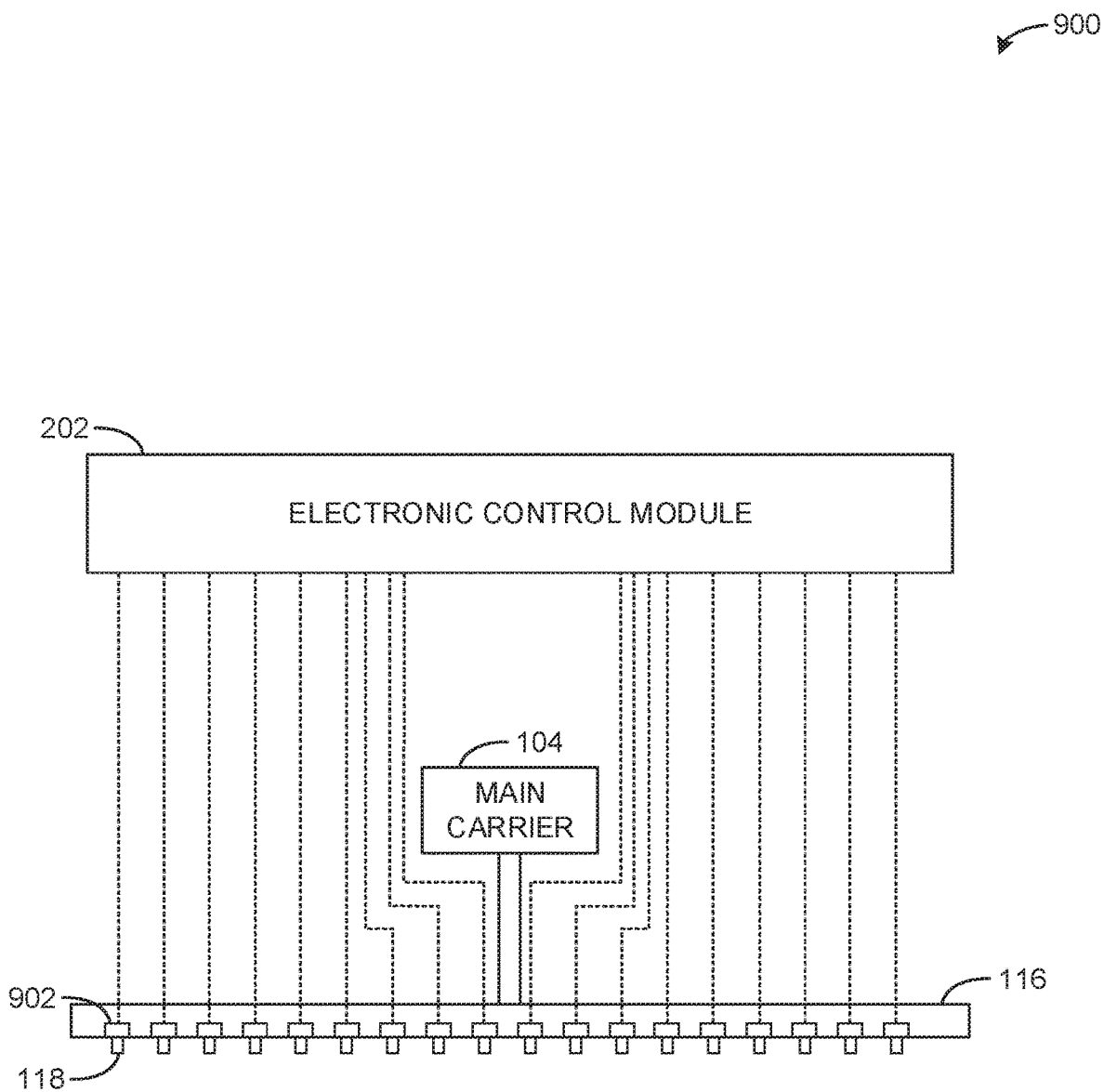
FIG. 9 is a partial schematic of an alternative configuration of the spraying system of FIG. 2 utilizing concentrate cartridges located at nozzles.

FIG. 9 is a partial schematic 900 of an alternative configuration of the spraying system 200 of FIG. 2 utilizing concentrate cartridges located at nozzles. The partial schematic 900 depicts the boom 116 and the nozzles 118, extending toward a treatment surface. The partial schematic 900 further depicts example concentrate cartridges 902 connected to the ones of the nozzles 118. In some examples, each one of the nozzles 118 is directly connected to one of the concentrate cartridges 902.

The example concentrate cartridges 902 of the illustrated example of FIG. 9 contain concentrate substance (e.g., concentrated weed killer, fertilizer, etc.), that is directly mixed with main carrier substance (e.g., water) from the main carrier tank 104 and subsequently dispensed as lawn treatment mixture from ones of the nozzles 118. In some examples, the main carrier tank 104 provides main carrier substance to the boom 116. When the electronic control module 202 provides signals to ones of the nozzles 118 to dispense lawn treatment mixture, main carrier substance is able to flow through the respective ones of the concentrate cartridges 902, thereby mixing main carrier substance with concentrate substance. After mixing, the lawn treatment mixture is dispensed out of the ones of the nozzles 118.

In some examples, the concentrate cartridges 902 are individually replaceable. For example, one or more of the concentrate cartridges 902 can be obtained and utilized to replace spent ones of the concentrate cartridges 902 after the concentrate substance has been depleted. In some examples, sensors may provide data to the electronic control module 202 indicating when ones of the concentrate cartridges 902 have been spent and should be replaced. In some examples utilizing the concentrate cartridges 902, the first mix tank 106 and the second mix tank 108 of the spraying system 200 of FIG. 2 are not necessary, as the concentrate substance and the main carrier substance are mixed directly at ones of the nozzles 118 prior to spraying. By utilizing a smaller volume of lawn treatment mixture, and only preparing lawn treatment mixture when necessary, minimal lawn treatment mixture is wasted.

Figure 10:
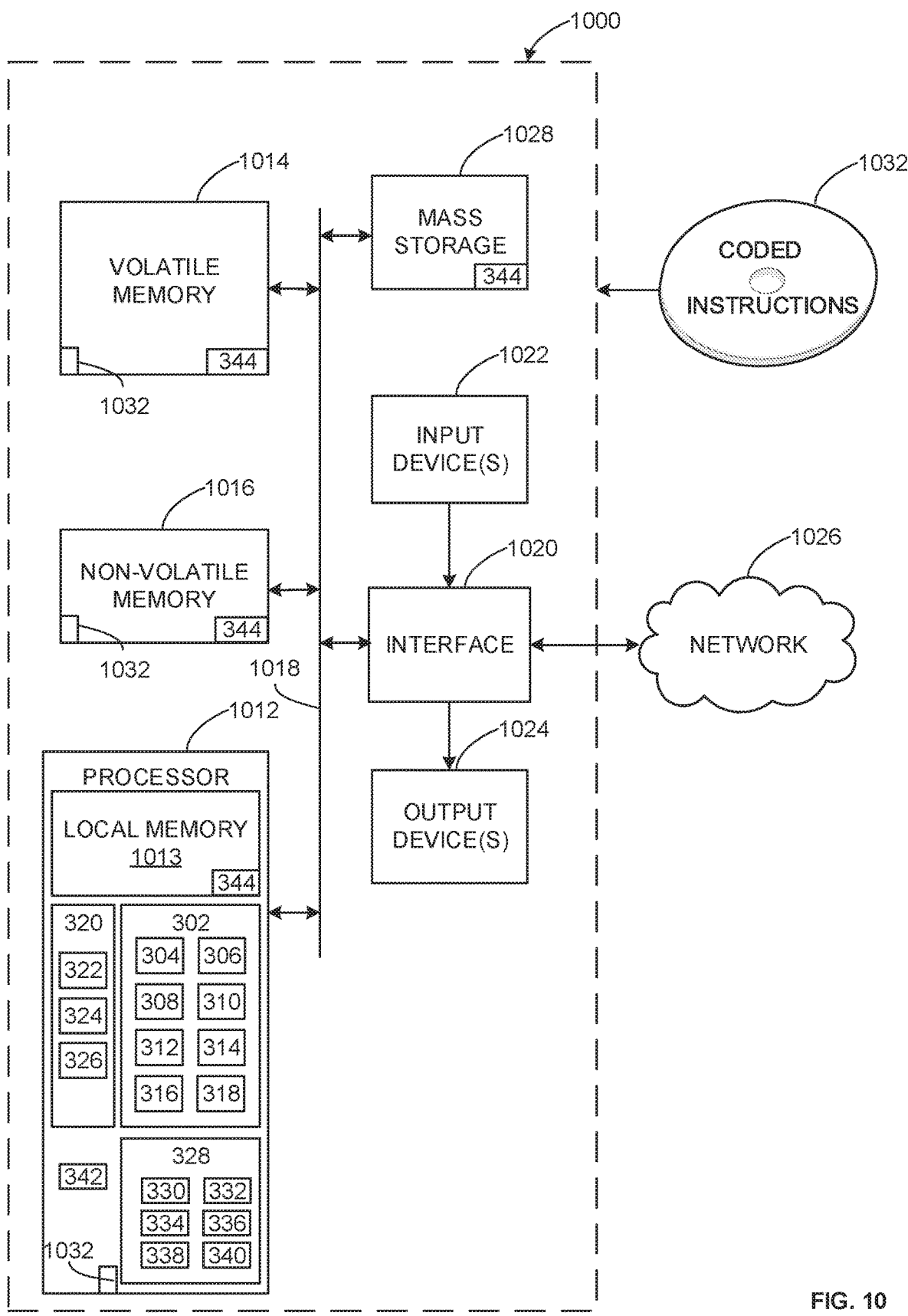
FIG. 10 is a block diagram of an example processing platform of structured to execute the example machine readable instructions of FIGS. 4A-4B, 5A-5B, 6, 7, and 8A-8B and/or to implement the electronic control module of FIGS. 2-3.

FIG. 10 is a block diagram of an example processor platform 1000 structured to execute the instructions of FIGS. 4A-4B, 5A-5B, 6, 7, and 8A-8B to implement the electronic control module 202 of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input data analyzer 302, the example position data accessor 304, the example fluid level analyzer 306, the example map generator 308, the example speed determiner 310, the example mapping data analyzer 312, the example concentrate top monitor 314, the example spray configurator 316, the example control mode selector 318, the example spray target analyzer 320, the example imager 322, the example image analyzer 324, the example spray target determiner 326, the example output controller 328, the example status monitor 330, the example pump controller 332, the example valve controller 334, the example nozzle controller 336, the example speed selector 338, the example display controller 340, the example timer 342, the example data store 344 and/or, more generally, the example electronic control module 202.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, a field-programmable grid array (FPGA) and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 4A-4B, 5A-5B, 6, 7, and 8A-8B may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that perform efficient lawn spraying utilizing two mix tanks to continually prepare small batches of lawn treatment mixture in one mix tank while the other mix tank provides lawn treatment mixture to nozzles. The methods, apparatus, and articles of manufacture disclosed herein improve the efficiency of lawn spraying processes by only using the necessary amount of concentrate solution, and further allowing an operator to change concentrate solutions when required with minimal waste (since only small batches of lawn treatment mixture are prepared, as opposed to conventional approaches that require manual mixing of the entire concentrate solution for one-time use). Example techniques disclosed herein also describe intelligent features that improve efficiency of lawn spraying procedures such as automated spray target identification, mapping of spray targets, an automated clean-out procedure, individual nozzle control for accurate spraying of targets and minimal waste, and other performance improving features. The disclosed methods, apparatus and articles of manufacture improve the efficiency of using a computing device by enabling intelligent control of the components of a tractor system to identify spray targets, to actuate components for the automated production and spraying of lawn treatment mixture, and to accurately control spraying of lawn treatment mixture. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A landscape treatment apparatus comprising:
a main carrier tank to store a solvent;
a concentrate tank to store a solute;
a first mix tank to receive the solvent and the solute as a first mixture;
a second mix tank to receive the solvent and the solute as a second mixture, the first mix tank to receive the solvent and the solute in alternation with the second mix tank receiving the solvent and the solute, the first mix tank to be pressurized after a first fluid level of the first mixture in the first mix tank satisfies a first upper fill threshold and the second mix tank to be pressurized after a second fluid level of the second mixture in the second mix tank satisfies a second upper fill threshold;
an electronic control module to:
obtain image data and mapping data corresponding to a landscape;
identify a spray target to apply at least one of the first mixture or the second mixture based on comparing the image data and mapping data to a first threshold;
store the image data associated with the spray target to enable future comparison of future image data of the spray target and the stored image data of the spray target;
in response to a determination that previously stored image data of the spray target is available for comparison with the obtained image data, compare the obtained image data and the previously stored image data associated with the spray target;
determine to continue spraying the spray target based on the comparison between the previously stored image data and the obtained image data;
in response to a determination to continue spraying the spray target, determine whether the identified spray target has been sprayed previously within a time threshold and at least one of:
in response to determining that the identified spray target has been sprayed previously within the time threshold, prevent application of the first mixture and the second mixture to the identified spray target; or
in response to determining that the identified spray target has not been sprayed previously within the time threshold or a determination that previously stored image data is not available for comparison with the obtained image data, allow application of at least one of the first mixture or the second mixture to the identified spray target; and
a boom to apply the at least one of the first mixture or the second mixture to the identified spray target in the landscape via one or more nozzles carried by the boom.

2. The apparatus of claim 1, wherein the boom is to apply the first mixture when the first fluid level of the first mixture in the first mix tank satisfies the first upper fill threshold.

3. The apparatus of claim 2, wherein the boom is to apply the first mixture when the first mix tank is pressurized.

4. The apparatus of claim 1, wherein the boom is to cease applying the first mixture when the first fluid level of the first mixture in the first mix tank does not satisfy a lower fill threshold.

5. The apparatus of claim 1, wherein the boom is to apply the first mixture from the first mix tank while the second mix tank receives the solvent and the solute.

6. The apparatus of claim 1, wherein the one or more nozzles is selectively actuated based on the identified spray target on the landscape.

7. The apparatus of claim 6, wherein the electronic control module to issue control signals to actuate the nozzles based on camera data corresponding to the identified spray target.

8. A non-transitory computer readable storage medium comprising instructions that, when executed, cause a processor to at least:
issue control signals to:
cause a first mix tank to receive a solvent and a solute as a first mixture;
cause a second mix tank to receive the solvent and the solute as a second mixture, the control signals to cause the first mix tank to receive the solvent and the solute in alternation with the second mix tank receiving the solvent and the solute;

obtain image data and mapping data corresponding to a landscape;

identify a spray target to apply at least one of the first mixture or the second mixture based on comparing the image data and mapping data to a first threshold;

store the image data associated with the spray target to enable future comparison of future image data of the spray target and the stored image data of the spray target;

in response to a determination that previously stored image data of the spray target is available for comparison with the obtained image data, compare the obtained image data and the previously stored image data associated with the spray target;

determine to continue spraying the spray target based on the comparison between the previously stored image data and the obtained image data;

in response to a determination to continue spraying the spray target, determine whether the identified spray target has been sprayed previously within a time threshold and at least one of:

in response to determining that the identified spray target has been sprayed previously within the time threshold, prevent application of the first mixture and the second mixture to the identified spray target; or in response to determining that the identified spray target has not been sprayed previously within the time threshold or a determination that previously stored image data is not available for comparison with the obtained image data, apply at least one of the first mixture or the second mixture to the identified spray target.

9. The non-transitory computer readable storage medium of claim 8, wherein the instructions, when executed, cause the processor to issue control signals to cause a boom to apply the first mixture when a first fluid level of the first mixture in the first mix tank satisfies the first upper fill threshold and the first mix tank is pressurized.

10. The non-transitory computer readable storage medium of claim 8, wherein the instructions, when executed, cause the processor to issue control signals to cause a boom to cease applying the first mixture when a first fluid level of the first mixture in the first mix tank does not satisfy a lower fill threshold.

11. The non-transitory computer readable storage medium of claim 8, wherein the instructions, when executed, cause the processor to issue control signals to selectively actuate one or more nozzles based on the identified spray target on the landscape.

12. The non-transitory computer readable storage medium of claim 11, wherein the instructions, when executed, cause the processor to access camera data to determine the identified spray target.

13. A landscape treatment method comprising:
storing a solvent;
storing a solute;
mixing the solvent and the solute to form a first mixture in a first mix tank;
mixing the solvent and the solute to form a second mixture in a second mix tank in alternation with mixing the solvent and the solute to form the first mixture;
obtaining image data and mapping data corresponding to a landscape;
identifying a spray target to apply at least one of the first mixture or the second mixture based on comparing the image data and mapping data to a first threshold;
storing the image data associated with the spray target to enable future comparison of future image data of the spray target and the stored image data of the spray target;

in response to a determination that previously stored image data of the spray target is available for comparison with the obtained image data, comparing the obtained image data and the previously stored image data associated with the spray target;

determining to continue spraying the spray target based on the comparison between the previously stored image data and the obtained image data;

in response to a determination to continue spraying the spray target, determining whether the identified spray target has been sprayed previously within a time threshold;

in response to determining that the identified spray target has been sprayed previously within the time threshold, preventing application of the first mixture and the second mixture to the identified spray target; and in response to determining that the identified spray target has not been sprayed previously within the time threshold or a determination that previously stored image data is not available for comparison with the obtained image data, applying at least one of the first mixture or the second mixture to the identified spray target.

14. The method of claim 13, including applying the first mixture to the landscape in response to a first fluid level of the first mixture in the first mix tank satisfying a first upper fill threshold.

15. The method of claim 14, including applying the first mixture to the landscape in response to the first mix tank being pressurized.

16. The method of claim 14, including ceasing application of the first mixture to the landscape in response to a first fluid level of the first mixture in the first mix tank not satisfying a lower fill threshold.

17. The method of claim 14, including applying the first mixture to the landscape while mixing the solvent and the solute to form the second mixture in the second mix tank.

18. The method of claim 14, wherein applying the first mixture to the landscape includes actuating one or more nozzles based on an identified spray target on the landscape.

19. The method of claim 18, further including identifying the identified spray target based on camera data.

20. The apparatus of claim 1, further including a three-way valve coupled to the first mix tank, the second mix tank, and a pneumatic pump, the pneumatic pump to pressurize the first mix tank and the second mix tank.

21. The apparatus of claim 1, wherein the electronic controller is to further:
identify a patch of landscape of the location associated with the spray target; and
send a reminder to an operator of an appropriate future time to travel to the identified location to initiate spraying of the spray target based on best-practices for the spray target.

22. The Apparatus of claim 1, wherein the electronic module is to further:

determine whether the identified spray target has been sprayed previously within the time threshold and at least one of:

in response to determining that the identified spray target has been sprayed previously within the time threshold, prevent application of the first mixture and the second mixture to the identified spray target; or in response to determining that the identified spray target has not been sprayed previously within the time threshold, allow application of at least one of the first mixture or the second mixture to the identified spray target.

* * * * *